United States Patent
Greifeneder et al.

(10) Patent No.: US 9,817,884 B2
(45) Date of Patent: Nov. 14, 2017

(54) METHOD AND SYSTEM FOR REAL-TIME, FALSE POSITIVE RESISTANT, LOAD INDEPENDENT AND SELF-LEARNING ANOMALY DETECTION OF MEASURED TRANSACTION EXECUTION PARAMETERS LIKE RESPONSE TIMES

(71) Applicant: Compuware Corporation, Detroit, MI (US)

(72) Inventors: Bernd Greifeneder, Linz (AT); Andreas Lehofer, St. Florian (AT); Günther Schwarzbauer, Linz (AT)

(73) Assignee: Dynatrace LLC, Detroit, MI (US)

( * ) Notice: Subject to any disclaimer, the term of this patent is extended or adjusted under 35 U.S.C. 154(b) by 501 days.

(21) Appl. No.: 14/338,707

(22) Filed: Jul. 23, 2014

(65) Prior Publication Data

US 2015/0032752 A1 Jan. 29, 2015

Related U.S. Application Data

(60) Provisional application No. 61/857,788, filed on Jul. 24, 2013.

(51) Int. Cl.
*G06F 17/30* (2006.01)
*H04L 12/24* (2006.01)
*H04L 12/26* (2006.01)

(52) U.S. Cl.
CPC ...... *G06F 17/30598* (2013.01); *H04L 41/064* (2013.01); *H04L 41/142* (2013.01); *H04L 43/04* (2013.01)

(58) Field of Classification Search
CPC .. G06F 17/30598; G06F 11/34; H04L 41/064; H04L 41/142; H04L 43/04
See application file for complete search history.

(56) References Cited

U.S. PATENT DOCUMENTS 6,073,089 A * 6/2000 Baker ................. G06F 11/0709
   702/185
6,597,777 B1 * 7/2003 Ho ....................... H04L 41/0896
   370/235

(Continued)

*Primary Examiner* — Huawen A Peng
(74) *Attorney, Agent, or Firm* — Harness, Dickey & Pierce, P.L.C.

(57) ABSTRACT

A combined transaction execution monitoring, transaction classification and transaction execution performance anomaly detection system is disclosed. The system receives and analyzes transaction tracing data which may be provided by monitoring agents deployed to transaction executing entities like processes. In a first classification stage, parameters are extracted from received transaction tracing data, and the transaction tracing data is tagged with the extracted classification data. A subsequent measure extraction stage analyzes the classified transaction tracing data and creates corresponding measurements which are tagged with the transaction classifier. A following statistical analysis process maintains statistical data describing the long term statistical behavior of classified measures as a baseline, and also calculates corresponding statistical data describing the current statistical behavior of the classified measures. The statistical analysis process detects and notifies significant deviations between the statistical distribution of baseline and current measure data. A subsequent anomaly alerting and visualization stage processes those notifications.

32 Claims, 19 Drawing Sheets

(56) References Cited

U.S. PATENT DOCUMENTS

| | | | | |
|---|---|---|---|---|
| 7,131,037 B1* | 10/2006 | LeFaive | ............... | H04L 41/0631 |
| | | | | 714/46 |
| 7,594,260 B2* | 9/2009 | Porras | ................... | H04L 41/142 |
| | | | | 709/224 |
| 7,917,393 B2* | 3/2011 | Valdes | ................ | H04L 41/0631 |
| | | | | 705/50 |
| 8,234,631 B2 | 7/2012 | Greifeneder et al. | | |
| 8,544,087 B1* | 9/2013 | Eskin | .................... | G06F 21/552 |
| | | | | 726/22 |
| 8,620,609 B2* | 12/2013 | Lakshminarayan | .. | G06F 17/141 |
| | | | | 702/179 |
| 8,713,190 B1* | 4/2014 | Goodall | ................ | H04L 41/142 |
| | | | | 709/231 |
| 8,938,533 B1* | 1/2015 | Bansal | .................. | H04L 43/022 |
| | | | | 709/200 |
| 2011/0276828 A1* | 11/2011 | Tamaki | ............... | G05B 23/0254 |
| | | | | 714/26 |
| 2012/0304172 A1 | 11/2012 | Greifeneder et al. | | |
| 2013/0185643 A1 | 7/2013 | Greifeneder et al. | | |
| 2014/0052624 A1 | 2/2014 | Bansal et al. | | |
| 2014/0136693 A1 | 5/2014 | Greifeneder et al. | | |
| 2014/0143868 A1* | 5/2014 | Shiva | .................... | G06F 21/552 |
| | | | | 726/23 |

\* cited by examiner

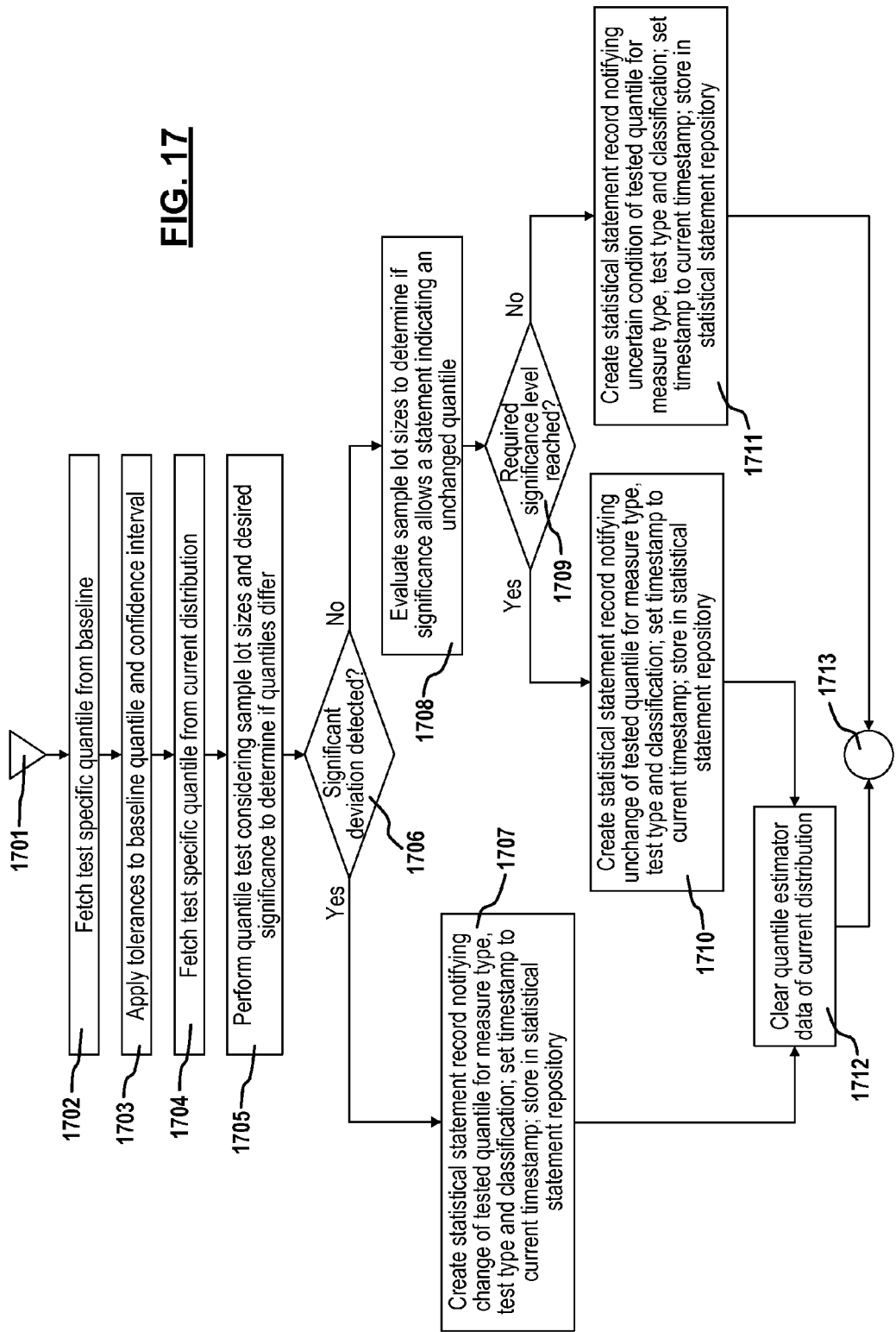

METHOD AND SYSTEM FOR REAL-TIME, FALSE POSITIVE RESISTANT, LOAD INDEPENDENT AND SELF-LEARNING ANOMALY DETECTION OF MEASURED TRANSACTION EXECUTION PARAMETERS LIKE RESPONSE TIMES

CROSS-REFERENCE TO RELATED APPLICATIONS

This application claims the benefit of U.S. Provisional Application No. 61/857,788, filed on Jul. 24, 2013. The entire disclosure of the above application is incorporated herein by reference.

FIELD

The present disclosure relates to the analysis of performance monitoring and tracing data of individual distributed transactions to identify distinct classes of transactions, extracting classification and measure data from transaction performance monitoring and tracing data and to detect statistical relevant anomalies of transaction execution performance measures.

BACKGROUND

Real-time monitoring of the performance of productive software applications, especially of high transaction volume and revenue generating applications like e-commerce applications has become crucial for the successful operation of such applications, because even short-term performance or functionality issues potentially have considerable impact on the customer base and the revenue of such applications.

However, the monitoring and alerting demands of application operation teams, responsible for unobstructed, outage-minimizing operation of such application which require information about the overall situation of the application, deviates from the demands of software architects and programmers responsible for fast identification and elimination of program code causing the performance or functionality problems, which require high-detail transaction execution performance information, down to the granularity of individual method executions.

Existing monitoring systems aiming to trace and monitor individual transactions at the granularity level required by software architects and programmers reached a level of unobtrusiveness in terms of operation and of efficiency in terms of monitoring caused overhead that allows to employ such monitoring systems in the day-to-day operation of large, high-volume productive software applications. A detailed description of such a monitoring system can be found in U.S. Pat. No. 8,234,631 "Method and system for tracing individual transactions at the granularity level of method calls throughout distributed heterogeneous applications without source code modifications" by Bernd Greifeneder et al. which is incorporated herein by reference in its entirety.

Albeit such systems provide the data required by software engineers to identify and fix punctual performance problems, the granularity of the provided data is way to fine to allow operation teams a fast and precise judgment of the overall situation of a monitored application.

Especially in high-load scenarios where applications receive hundreds or even thousands of requests per minute resulting in the execution of hundreds and thousands of complex transactions per minute, a situation which is typical for modern e-commerce applications, conventional, threshold based alerting systems are inadequate due to the large number of generated false-positive alerts. Reason for this is the large number of transactions, which increases the possibility of performance outliers, which only reflect a negligible fraction of the performed transactions. Such outliers are also negligible from application operational and financial point of view, but would still trigger undesired alerts. Even baseline oriented alerting systems, using historic performance measurements to establish expected values for current and future measurements run into the same problem because they use the baseline threshold to create alerts based on single measurements.

Application operation teams mostly rely on infrastructure monitoring systems, which monitor the utilization of infrastructure resources, like CPU, disc or memory usage of the host computers running the monitored applications to determine the health state of an application and to decide appropriate countermeasures to detected or anticipated performance problems. As an example, the memory consumption of a process running an application may be monitored. In case the memory consumption exceeds a specific limit, the application process is restarted. Although this approach fulfills the needs of application operation, and may in case of an existing clustering/failover system cause no lost or failed transactions, it does not provide analysis data that helps to identify and fix the root cause (e.g. memory leak) of the problem.

The tendency to outsource and concentrate operation of such applications to external data-centers or even to cloud computing system adds another dimension of complexity to the problem of identifying the root cause of performance or functionality problems of productive applications, because it may blur the relationship between an application and the computing environment used to execute the application. In such environments, computing infrastructure like host computer systems, or processes running virtual machines, may be dynamically assigned to applications depending on the current load situation.

As a consequence, a monitoring and alerting system is required that fulfills the needs of both software development and maintenance teams and of application operation teams. It should on the one hand provide transaction tracing and monitoring data at finest granularity level, allowing the detection of the code causing the performance problem and on the other hand produce outlier and false-positive resistant, reliable alerts as required by application operation teams.

The desired solution should also be able to cope with outsourced applications or multi-application data-centers, where the monitoring system should be capable to identify and monitor a multiple of applications or application components, like e.g. a product search component or a product purchase component. Additionally, the desired solution should reduce the required configuration effort to identify and monitor applications or application components to a minimum.

This section provides background information related to the present disclosure which is not necessarily prior art.

SUMMARY

This section provides a general summary of the disclosure, and is not a comprehensive disclosure of its full scope or all of its features.

A monitoring and alerting system capable for large volume, productive applications is disclosed, that analyzes individual transactions processed by the monitored application. The analysis result allows detecting in real-time if the performance behavior of the application as a whole, not of an individual transaction has changed.

Exemplary embodiments of the current disclosure provide mechanisms to extract classification parameters, like parts of an URL of a web request, identifying transactions directed to a specific application or a component of a specific application, like a "product search" or a "purchase" component, and to tag incoming transactions with the extracted classification parameters.

Some variants of those embodiments may further extract measures describing the performance behavior of monitored transactions, which are also tagged with the transaction classification extracted from the transaction trace data.

Yet other variants of those embodiments may calculate statistical parameters from historic classified measurements, describing the performance behavior of the application or application component identified by the classification value during a reference period, which may be used as baseline.

Again other variant embodiments may calculate statistical parameters from current classified measurements, describing the current performance behavior of the application or application component identified by the classification value, and may use statistical parameters describing current and baseline performance behavior to identify statistical relevant deviations between baseline and current performance behavior.

Still other variants of those embodiments may use quantile estimations for the statistical description of baseline and current behavior, and perform statistical tests using those quantile estimations to detect deviations between baseline and current behavior that take the quality of the quantile estimation into account.

Yet other variants of those embodiments may use multiple quantile estimators using different reset mechanisms for quantile estimation data to detect fast performance trend changes.

Other embodiments of the current disclosure may forward detected statistical relevant deviations between baseline and current performance measurements to an alerting processor, which uses alerting rules e.g. considering current and past detected deviations to create alerts.

Yet other embodiments of the current disclosure may analyze incoming classified transaction tracing data to detect and mark failed transaction executions. Return codes indicating unexpected transaction results or detected uncaught exceptions during transaction executions may be used to mark traced transactions as failed.

Variants of those embodiments may use the transaction failure indicator to calculate failure rates of a set of historic, baseline transactions and a set of recently executed transaction representing the current failure rate condition of an application or application component.

Yet other variants of those embodiments may use statistical methods to describe the occurrence of relatively rare events like transaction failures to create a statistical description of the baseline failure rate, and to create a statistical description of the current failure rate and to use both statistical descriptions to determine if a statistically significant deviation between the baseline and the current error rate occurred.

Some other variants of those embodiments may assume Poisson or Binominal distribution of observed failure rates and use appropriate statistical processes and methods to generate parameters describing baseline and current failure expectancy and detect statistically significant deviations.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 shows an overview of a monitoring and anomaly detection system consisting in at least on agent providing transaction execution monitoring and tracing data, and a monitoring node, dedicated to analyze and classify received transaction monitoring and tracing data, to detect anomalies in transaction execution performance measurements and to alert on such detected anomalies.

FIGS. 2A-C show transaction trace data records which may be used to represent transaction tracing and monitoring data in form of data records representing whole end-to-end transactions, data records representing individual thread executions of a monitored transaction and data records to represent individual method executions within a thread execution.

Figure 8A:
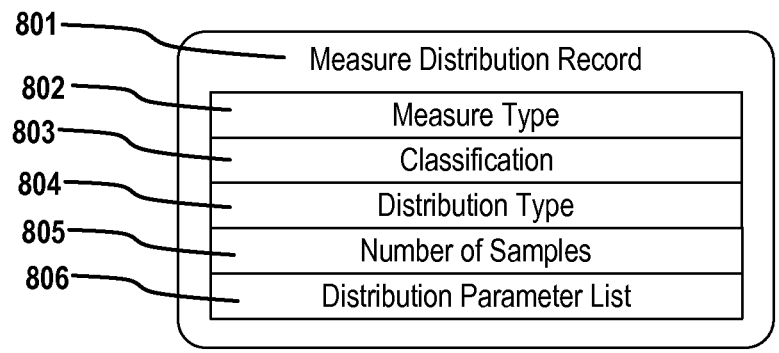
Figure 8B:
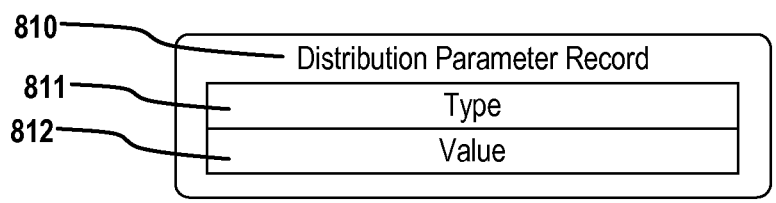

FIGS. 8A-B show measure distribution and distribution parameter records which may be used to store statistical data representing the statistical distribution of measures of a specific type and classification.

Figure 9:
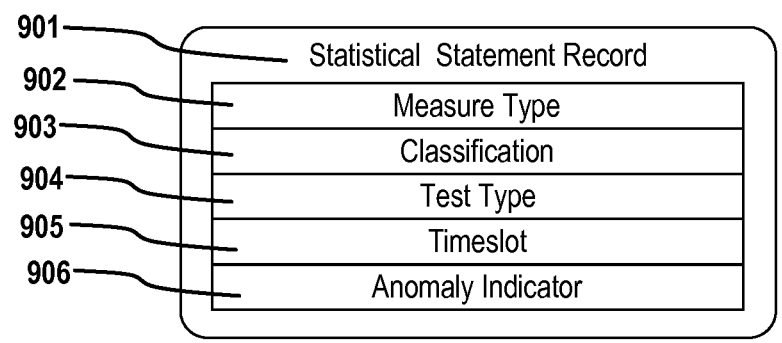

FIG. 9 shows a statistical statement record which may be used to store results of a statistical test comparing different statistical distributions of measures with a specific measure type and classification.

Figure 10A:
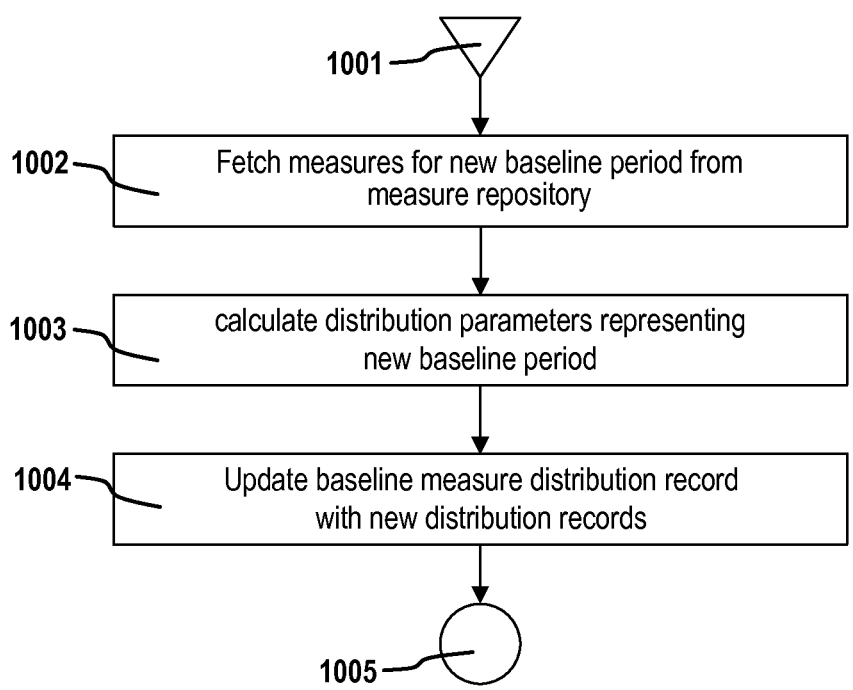
Figure 10B:
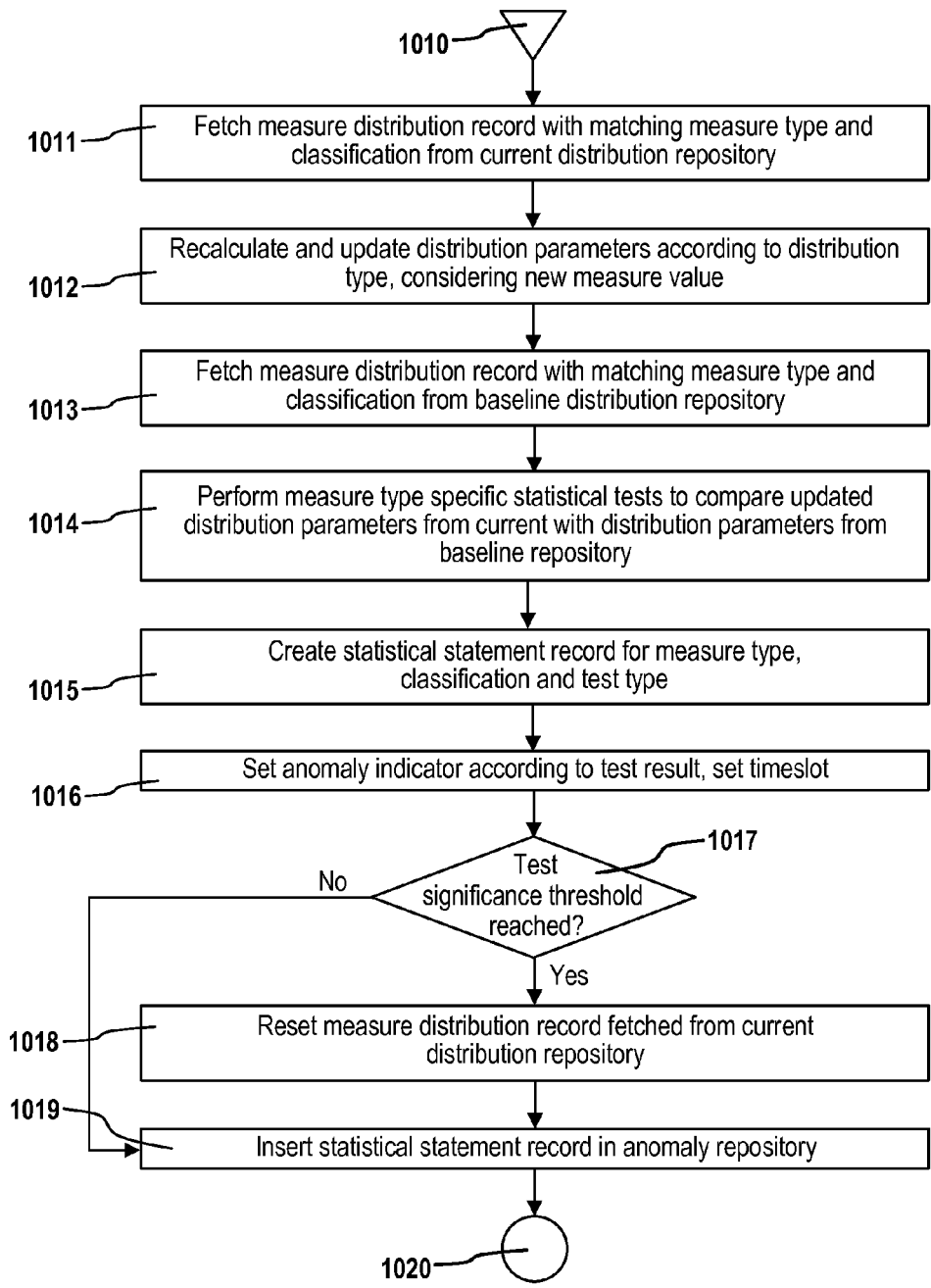

FIGS. 10A-B conceptually show the process of cyclically updating the statistical baseline data used by statistical test and the process to update statistical data representing the current distribution of the observed measure, including the statistical test to detect deviations between baseline and current data.

Figure 11:
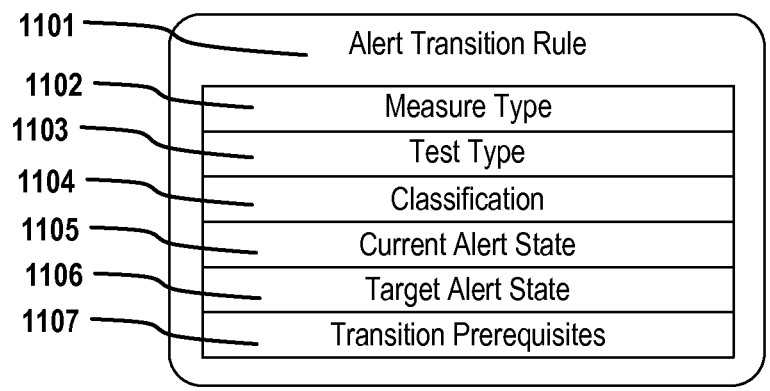

FIG. 11 shows an alert transition rule record which may be used to store rules that evaluate statistical statement records and to change the state of an alert corresponding to those statistical statement records.

Figure 12:
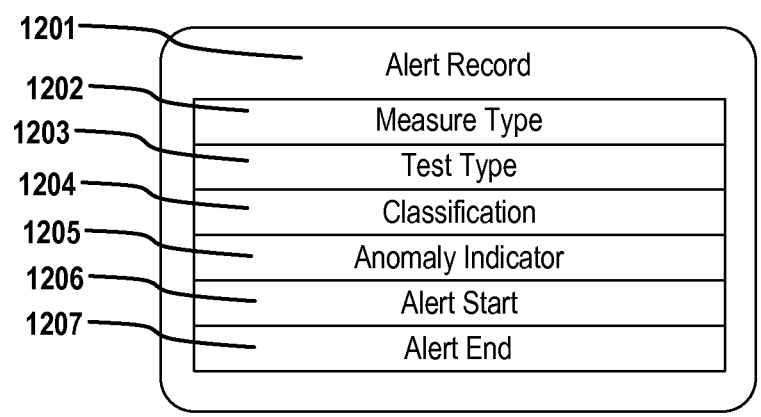

FIG. 12 shows an alert record which may be used to store an alert that represents a detected transaction execution performance anomaly.

Figure 13:
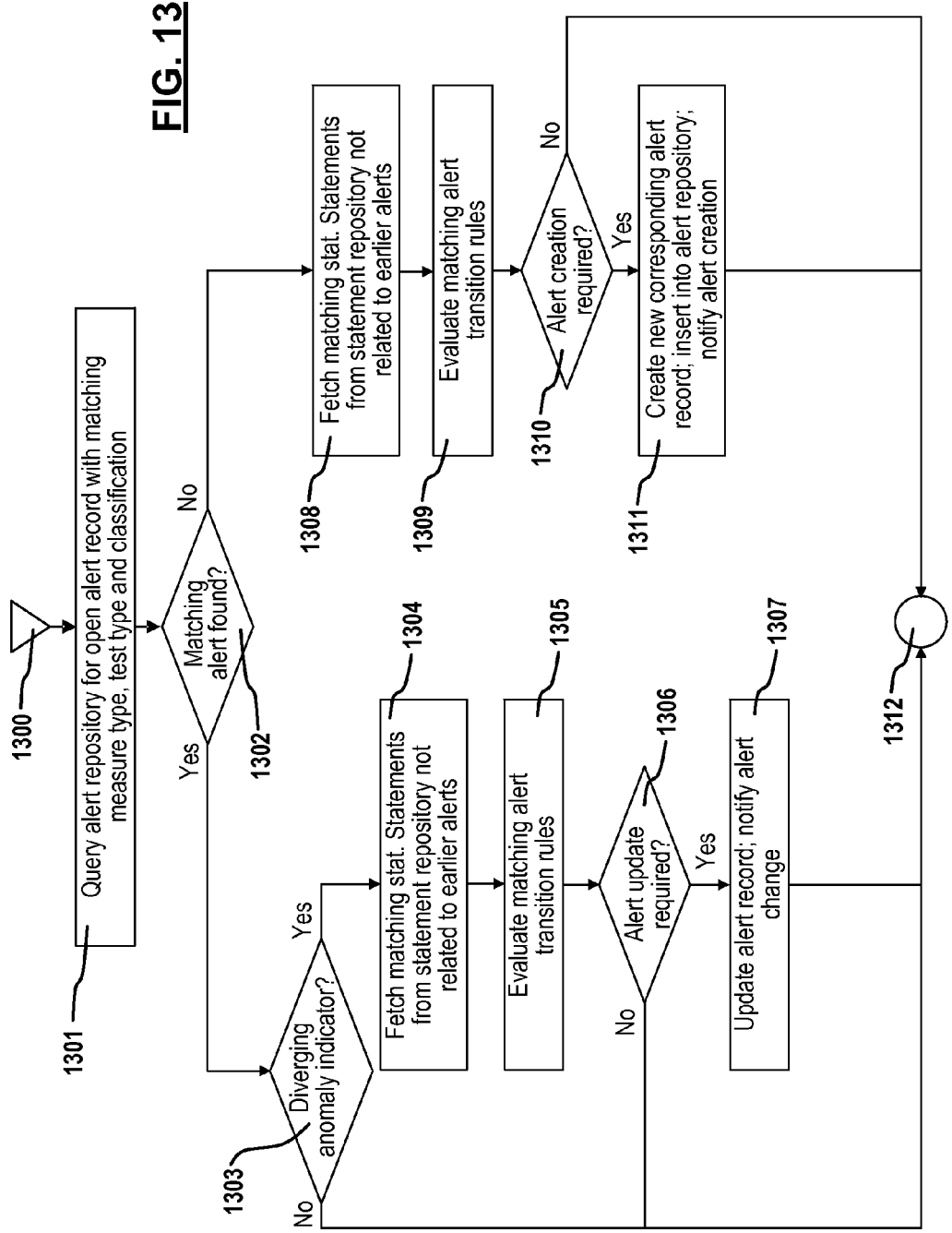

FIG. 13 conceptually shows the processing of statistical statements by the alert processing stage to update corresponding alerts according to matching alert transition rules.

Figure 14A:
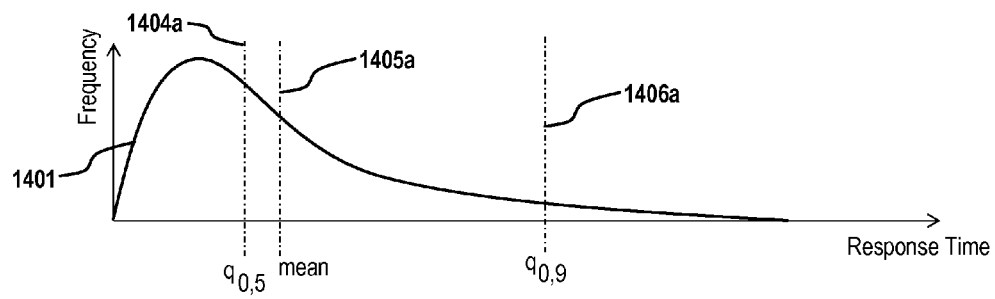
Figure 14B:
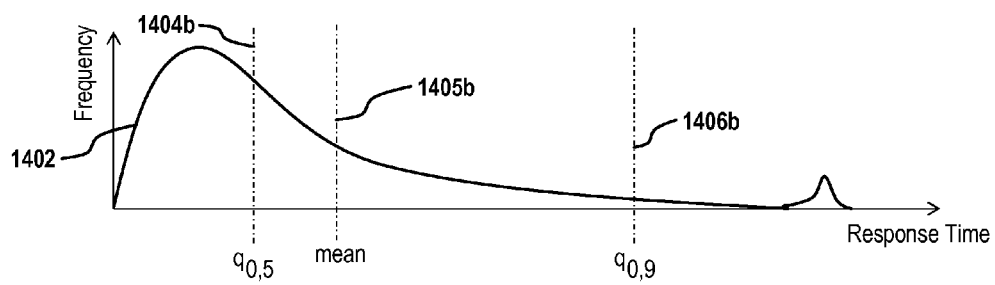
Figure 14C:
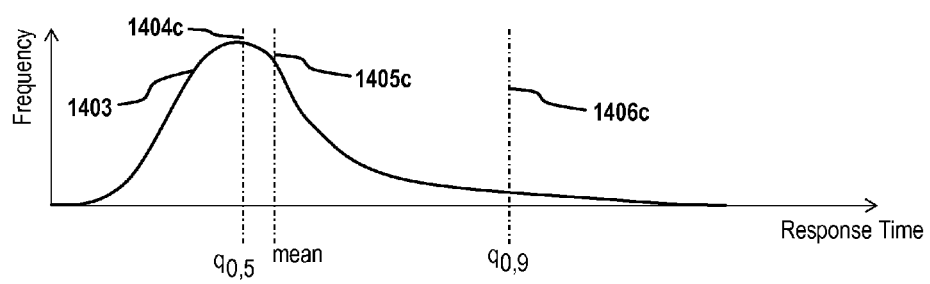

FIGS. 14A-C show the statistical density function of measured transaction response times.

Figure 15:
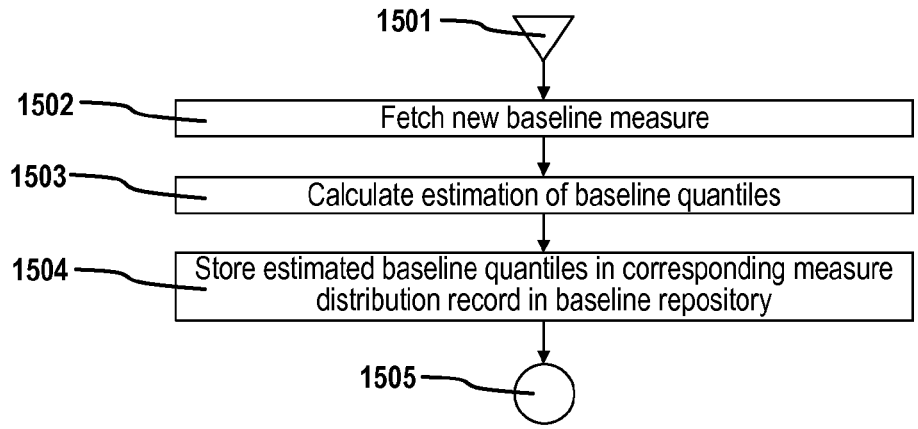

FIG. 15 shows a process that updates statistical baseline data in form of quantile estimations representing the statistical distribution of the baseline of a specific measure.

Figure 16:
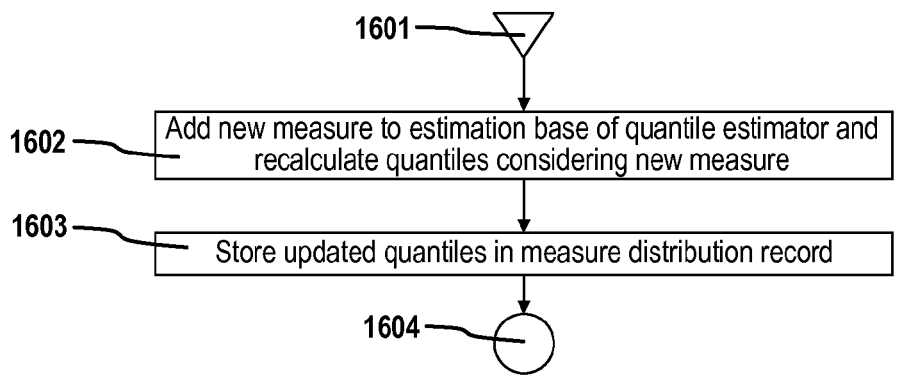

FIG. 16 depicts a process that updates statistical data in form of quantile estimations that represents the current statistical distribution of a measure.

FIG. 17 shows a process that performs a quantile based statistical test to detect statistically relevant deviations between corresponding current and baseline measurements.

Figure 18A:
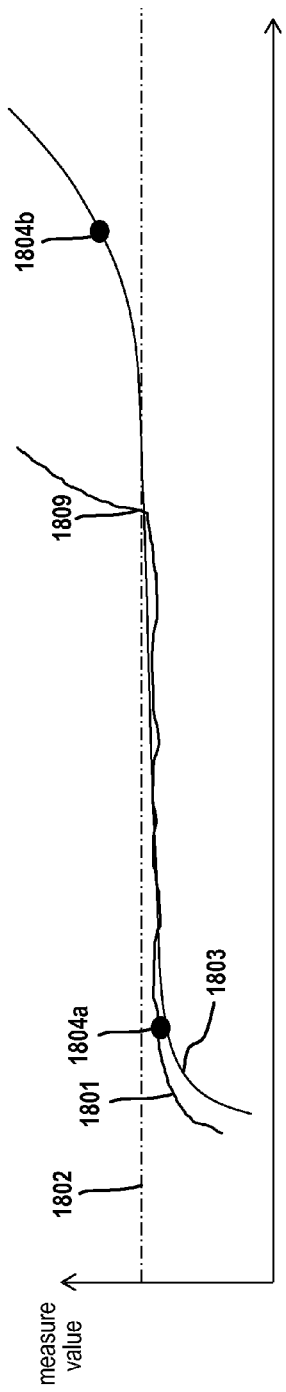
Figure 18B:
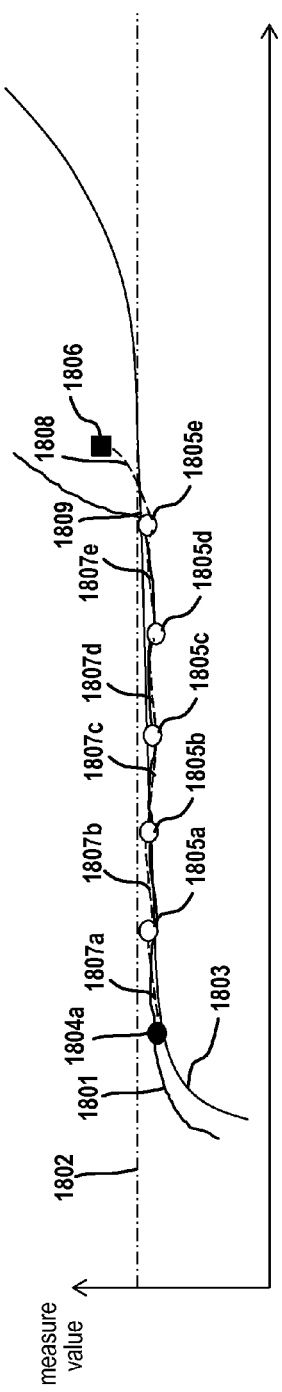

FIGS. 18A-B describe a situation, where a specific measure of a specific transaction class gradually and slowly approaches its corresponding baseline and afterwards fast and significant exceeds the baseline, leading to a slow reacting current baseline estimation causing delayed detection of the deviation. Additionally it shows a solution to this problem using a second baseline estimator which is reset more frequently.

Figure 19A:
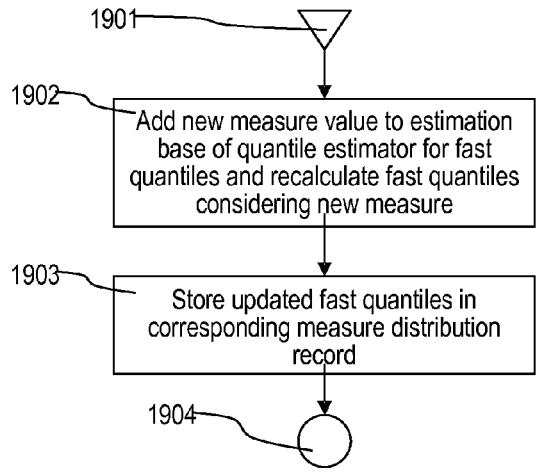
Figure 19B:
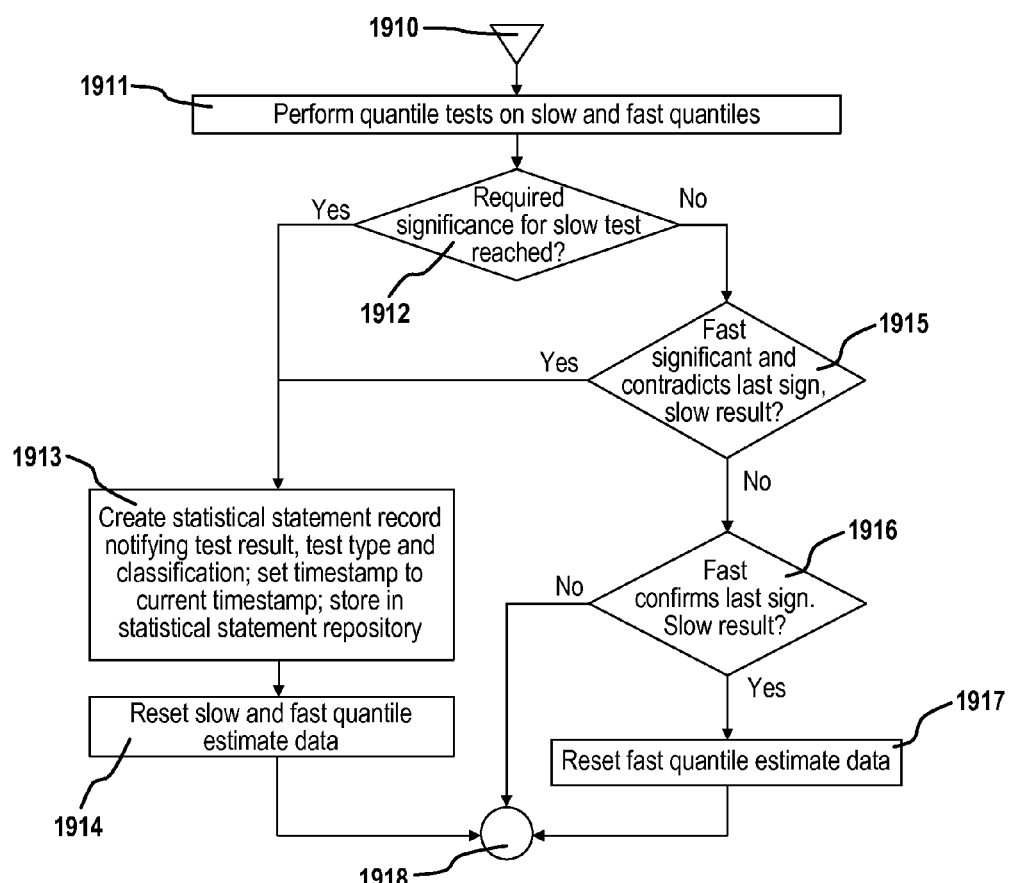

FIGS. 19A-B show the process of maintaining a second, more frequently reset baseline estimator and the process of additionally using the second baseline estimator to detect anomalies in situations as described in FIG. 18.

Figure 20:
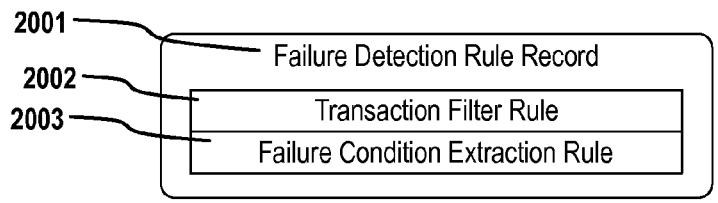

FIG. 20 shows a failure detection rule record, which may be used to define and store rules to determine if a received transaction trace describes a successful or failed transaction execution.

Figure 21:
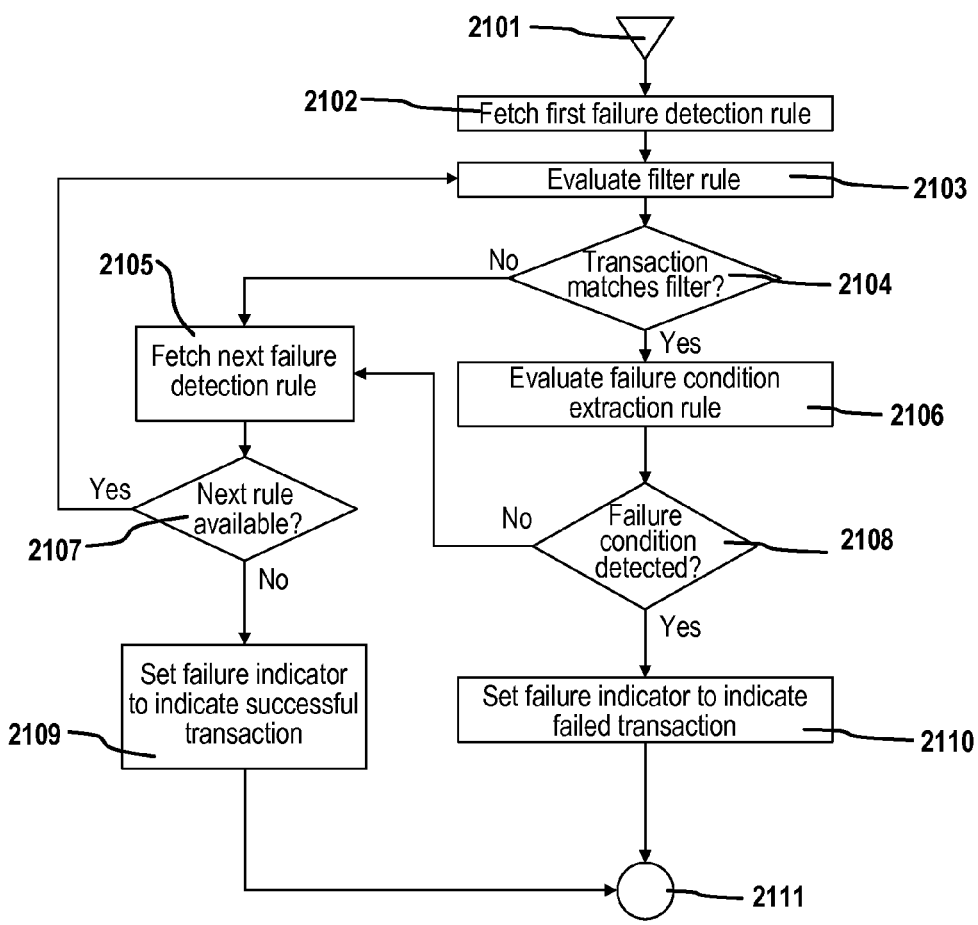

FIG. 21 conceptually shows the processing of multiple failure detection rule records on transaction trace data to determine if the described transaction was successful or failed.

Figure 22:
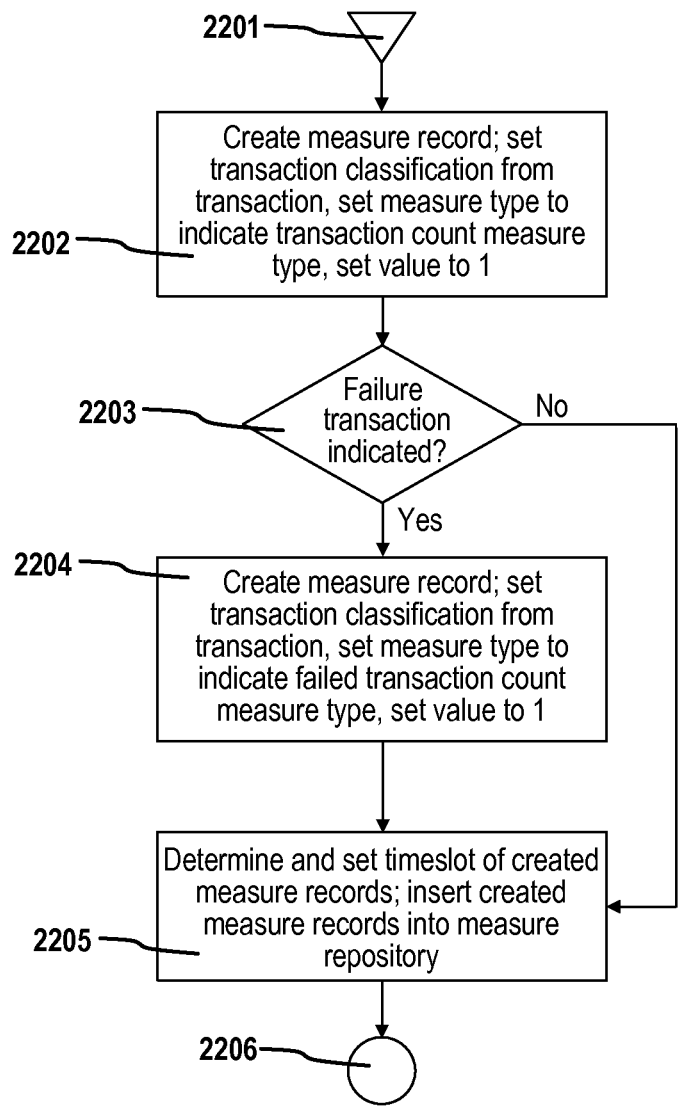

FIG. 22 shows the process of generating measures describing the amount of performed transactions (successful and failed) and the amount of failed transactions for a specific time interval.

Figure 23:
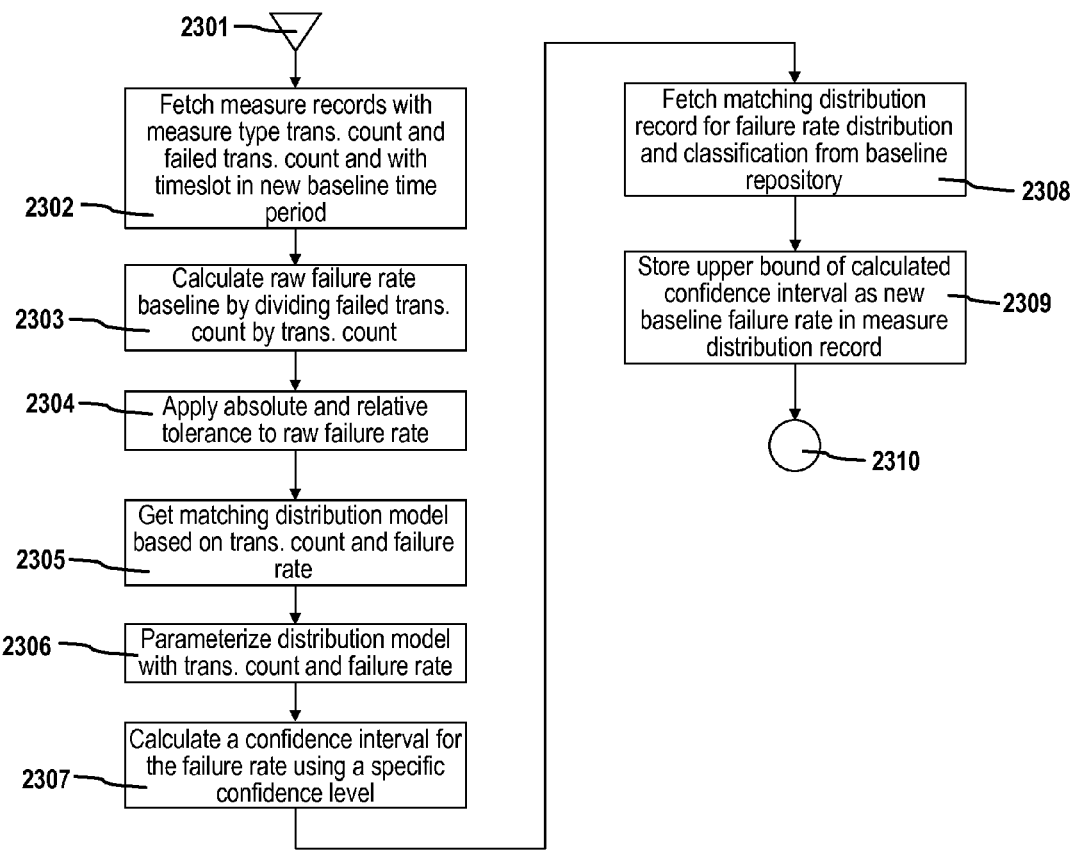
Figure 24:
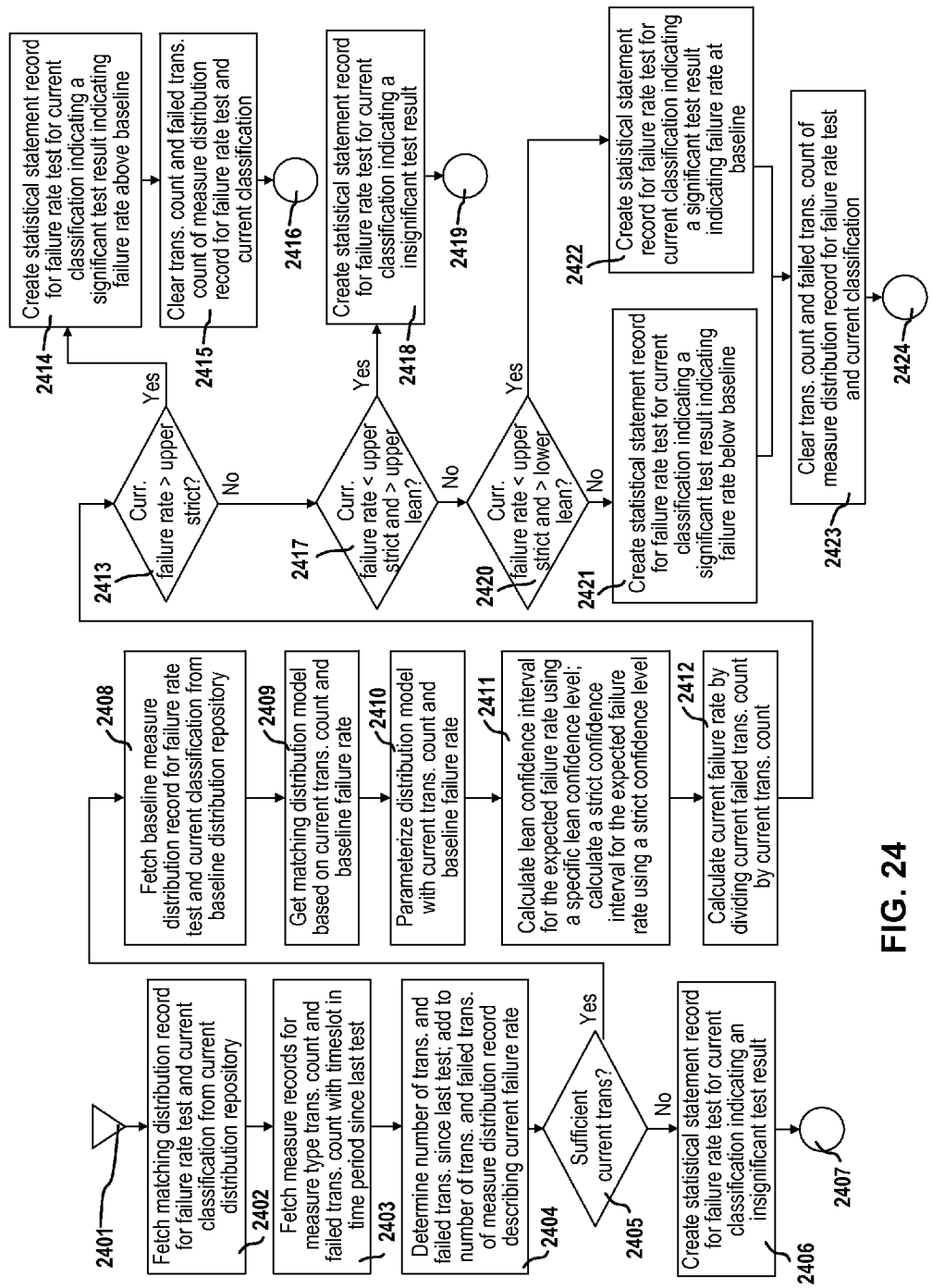

FIG. 23 shows the process of determining a baseline value failure rate using a specific historic reference time interval FIG. 24 shows the process of calculating a failure rate specific for current transaction executions and comparing it to a failure rate representative for a historic reference time interval.

Corresponding reference numerals indicate corresponding parts throughout the several views of the drawings.

DETAILED DESCRIPTION

Example embodiments will now be described more fully with reference to the accompanying drawings.

The described embodiments and variants are directed to performance monitoring and alerting systems capable to handle highly complex, high volatile and high load scenarios. The possibility of false-positive alerts and the required configuration effort are minimized. The described systems use statistical methods to compare a set of historic transaction measurements representing a performance baseline, with a set of currently or recently executed transactions representing the current performance situation of a monitored application. The result of this comparison is used to decide if an alert is triggered or not.

Figure 1:
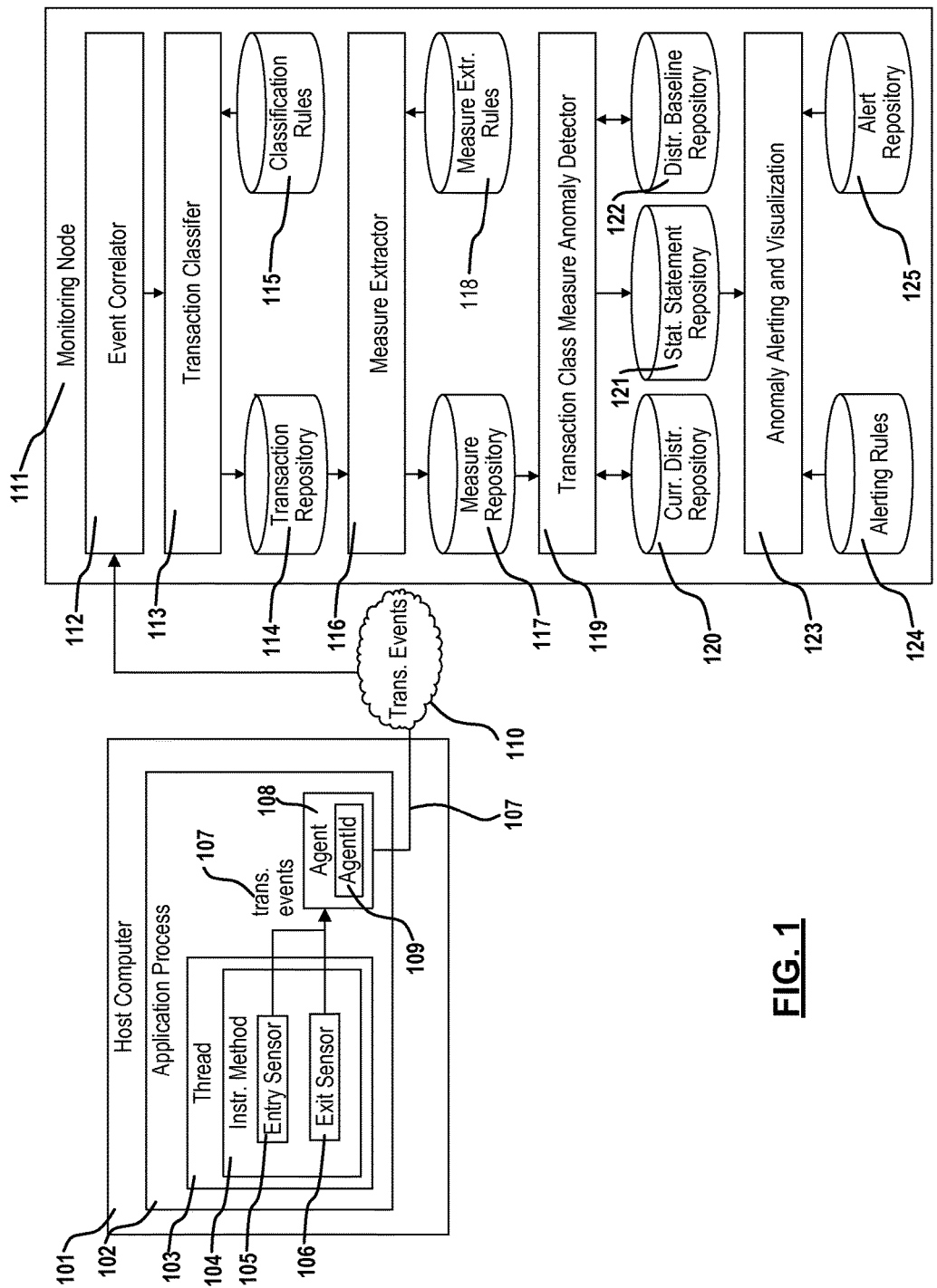

Referring now to FIG. 1 which shows an overview of a monitored application process with a deployed agent that generates and sends transaction tracing data, and a monitoring node 111 which receives transaction tracing data, incrementally builds end-to-end tracing data and performs various evaluations and analyses on the created end-to-end tracing data, including a statistical, baseline oriented performance anomaly analysis. In the example embodiment, the monitoring node 111 is further defined as a transaction monitor application which resides on a monitor computer.

A host computer 101 executes an application process 102 which may be part of a more complex distributed application consisting in multiple, communicating application processes, executed on different host computer systems to fulfill incoming requests. The application process is involved in the execution of distributed transactions. An agent 108 is deployed to the application process 102, which instruments specific methods 104 that are called during transaction executions with entry 105 and exit 106 sensors. Those sensors are triggered on the execution of such instrumented methods 104 by a thread 103 and create notifications in form of transaction events 107 signaling start and end of the execution. Additionally, such sensors may capture and send method execution context data, like type and value of method parameters and return values. As an example, a method dedicated to receive and handle HTTP requests may be instrumented with an entry sensor that captures the received URL. An agentId 109 may be assigned to the agent 108 which uniquely identifies the agent 108.

The agent receives transaction events 107 from the instrumented sensors and forwards them to a monitoring node 111 via a connecting computer network 110. Multiple agents, deployed to multiple application processes running on different hosts may send their transaction events to the monitoring node 111. The monitoring node forwards received transaction events to an event correlator 112 which uses correlation data contained in the received transaction events to create end-to-end transaction tracing data. Agents and sensors may be injected into the monitored system by augmenting application specific code with monitoring specific code that performs acquisition of measurement data and execution context correlation data and communication with a monitoring node 111. The injection may either be performed permanent by manipulating source code of the monitored application and recompiling it, or it may be injected on the fly, during runtime of the monitored application. Runtime injection may be performed using byte-code instrumentation techniques for byte-code executing parts of the monitored application like Java™, .NET or PHP processes as described in U.S. Pat. No. 8,234,631. It may also be performed by manipulating and injecting JavaScript™ code into HTML pages produced by the monitored applications and displayed by web browsers used to interact with the monitored application according to the teachings of U.S. patent application Ser. No. 13/722,026 "Method And System For Tracing End-To-End Transaction, Including Browser Side Processing And End User Performance Experience" and U.S. Ser. No. 14/056,016 "Method And System For Browser Based, Non-Intrusive Measuring Of End-User Perceived Performance Of Individual Third Party Resource Requests" both by Bernd Greifeneder et al. which are incorporated herein by reference in their entirety.

Sensors may also be implementing by hooking or modifying calls to the runtime environment of the monitored process indicating the execution of monitored methods in case of e.g. PHP or web server processes. Those hooks or modifications may be used to recognize the execution of specific methods, to capture execution context data like method parameters or return values and to send the captured data to a monitoring node 111 in form of transaction events 107. Sensors may also provide portions of end-to-end tracing data in cooperation with call-stack sampling technologies as described in U.S. patent application Ser. No. 13/455,764 "Method and System for Transaction Controlled Sampling of Distributed Heterogeneous Transactions without Source Code Modifications" by Bernd Greifeneder et al. which is incorporated herein by reference in its entirety.

The event correlator 112 forwards finished end-to-end transaction tracing data to the transaction classifier 113, which extracts classification data form received transactions using classification rules 301 stored in a classification rule repository 115. The purpose of the classification process is to detect and group transactions performing similar or the same tasks, to get homogenous groups of transactions which under normal conditions show similar performance behavior. Statistical tests for such homogenous groups can be performed in a stricter fashion, because a "normal" behavior of such homogenous groups can be predicted exacter, and deviations from a "normal" behavior can be detected earlier.

The processing of an exemplary, URL based classification rule for a specific end-to-end transaction trace would e.g. first fetch the URL received with the request that initiated the transaction and then analyze the data of the URL to extract classification data. An URL consists, among other parts, in the name of the server to which the request was sent, a path identifying an addressed resource or component on the server, and a query string influencing the calculation of the response created by the addressed component. The URL based classification rule may e.g. specify to extract server name and path of the URL and use it as classification. Using this exemplary classification rule, following URLs "http://www.myshop.com/products/list?page=1" and "http://www.myshop.com/products/search?name=prod1" would create classifications "http://www.myshop.com/products/list" and "http://www.myshop.com/products/search". All transactions addressing the "list" component would fall into the first category and all transactions addressing the "search" component would fall into the second category.

The grouping of monitored transactions into homogenous groups according to application component or functionality also provides more fine grained monitoring and alerting results. In case the performance behavior of a specific transaction class significantly changes, alerts can be triggered that identify the component assigned with the transaction class which eases the isolation of potential root causes of the performance problem.

The transaction tracing data is tagged with the extracted classification value and further processed by a measure extractor 116 which evaluates the transaction tracing data according to measure extraction rules 501 in a measure extraction rule repository 118 to create measure records 601 describing specific performance parameters of the transaction. An example measure would be the total response time of the transaction. The measure records 601 are also tagged with the transaction classification and stored in a measure repository 117.

A transaction class measure anomaly detector 119 fetches the classified measures from the measure repository and cyclically creates and updates historic baseline data describing the statistical distribution of measures with the same classification and measure type. As an example, one baseline distribution description may be created for all historic total response time measures of classification "application1/component1" and another baseline description may be created for all historic total response time measures of classification "application1/component2". This baseline description data may e.g. consider all measurements from the last day, and may be recalculated daily. Those baseline descriptions are stored in a baseline repository 122 in form of measure distribution records 801.

The transaction class measure anomaly detector 119 also creates similar statistical distribution descriptions for a set of current measures, which are stored in a current repository 120. The set of current measures may be defined as all measures of a specific classification and type that are younger than a specific time threshold, e.g. five minutes, or the last n measures of a specific classification and type, or all measures of a specific classification and type since a statistic test comparing baseline and current measures of the specific classification and type provided a result with a significance above a certain level.

Statistical tests are cyclically performed that compare corresponding baseline and current distribution descriptions to identify statistically significant baseline deviations. The results of those tests are stored in a statistical statement repository 121 in form of statistical statement records 901.

An anomaly alerting and visualization module 123 fetches statistical statements records 901 and evaluates alerting rules based on new and historic statistical statements to determine if an alert should be triggered.

Transaction processing and analysis is performed by the monitoring node in real-time and in parallel and pipe-lined fashion. While a first set of transaction traces is processed by the measure extractor 116 to generate measures describing the transactions, a second set of transaction traces may be processed by the transaction classifier 113, while a third set of transaction traces describing currently ongoing transactions is still incrementally created by the event correlator 112. Anomaly detection and alerting works concurrently and independent to the transaction trace creation and analysis processing pipeline. The statistical analysis and alerting is performed during runtime of the monitored application and while the monitored application is running and processing transactions. The reported anomaly states represent the state of the monitored system at the point of time of the last statistical test. The optimal test execution frequency is influenced by the load of the monitored application (high load causes increases the number of statistical samples and allows higher frequencies) and the computational and mathematical complexity of the test (higher complexity requires more CPU cycles and potentially restricts to lower frequencies). A typical test interval which represents a good tradeoff between both requirements is 1 minutes. It allows to execute also more complex tests and it guarantees that the reported anomaly status is not older than one minute. This guarantees that the visualized or notified performance or failure rate anomaly state is not older than one minute.

The transaction repository 114 contains transaction traces of all monitored transactions performed by the monitored application. With increasing operation time of the monitoring system, and with rising load of the monitored application, the amount of transaction traces rises, until it becomes unpractical or even impossible to keep all transaction traces in main memory. In such situations, transactions with an older execution time, e.g. older than one hour, may be persistently stored, e.g. in a database or in a file, and removed from the main memory. Access to transaction traces may be provided in a transparent way, i.e. for a client requesting transactions, it is not noticeable if the transaction trace is fetched from main memory or from a persistent storage.

The same situation may occur for measure records stored in the measure repository 117. Also in this case, older measure records may be removed from main memory and stored in a persistent storage. For clients requesting measures (e.g. to calculate baseline data), it is not noticeable if the measure records are fetched from main memory or from a persistent storage.

Figure 2A:
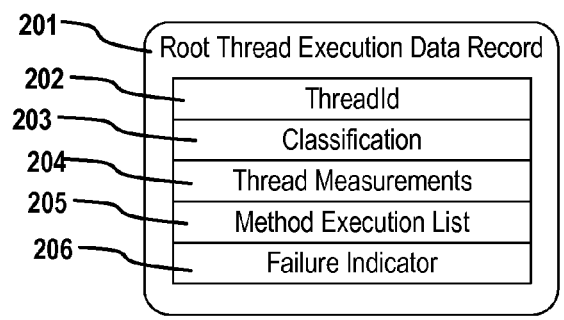
Figure 2B:
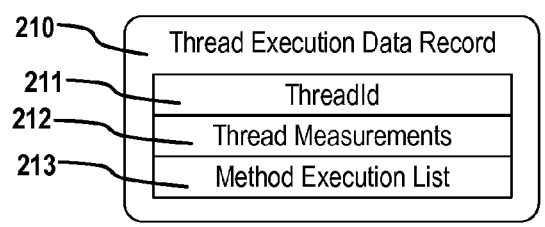

Data records dedicated to the storage of individual end-to-end transaction traces are described in FIG. 2. Root thread execution data records 201, as shown in FIG. 2a and thread execution data records 210 as shown in FIG. 2b, are used to represent individual thread executions forming an end-to-end transaction. Root thread execution data records represent a thread execution that handles a request that enters a monitored application. Such a root thread execution may spawn other thread executions which are represented by thread execution data records 210 that are linked with the root thread execution data record as child thread executions. Those child thread executions may in turn spawn other thread executions which are linked as child thread executions of those threads. The linking between parent and child thread executions is modelled using method list entries 220 describing methods executed by a thread. Each method list entry 220 is part of the method execution list 205/213 of a root thread execution data record 201 or a thread execution data record 210. In case a monitored method spawns a thread, an entry in the child thread execution list 224 of the corresponding method list entry 220 is created which refers to the corresponding thread execution data record 210 describing the spawned thread. A root thread execution data record 201 may be used to represent a whole end-to-end transaction trace.

A root thread execution data record 201 and a thread execution data record 210 may contain but is not limited to a threadId 202/211 that uniquely identifies a specific thread execution performed by a specific process on a specific host computer system, thread measurements 204/212 providing measurements describing the thread execution as a whole, like name or execution priority of the thread, and method execution list 205/213 containing a list of monitored method executions performed by the thread, in a way that allows to reconstruct nesting level and sequence of the method executions.

A root thread execution data record 201 may in addition contain a classification field holding the classification of the represented end-to-end transaction. Such a root thread execution data record 201 may also contain a failure indicator 206 which is set by a process that analyzes the root thread execution data record and all its connected thread execution records and method list entries to determine if the transaction execution terminated with a failure or not.

Figure 2C:
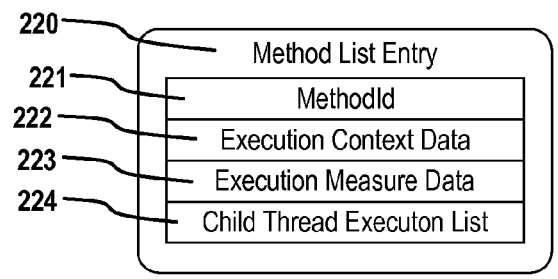

A method list entry 220 as depicted in FIG. 2c may be used to represent an individual monitored method execution performed as part of a thread execution.

A method list entry 220 may contain but is not limited to a methodId 221 identifying the type of the executed method by the name of the method, the name of the class declaring the method and the signature of the method, execution context data 222 containing captured method parameter values and method return values, and execution measure data 223 containing performance measures describing the method execution, like execution duration or CPU usage of the method execution, and a child thread execution list 224, containing references to thread execution data records 210 describing thread executions that the method execution described by the method list entry has spawned and started.

End-to-end tracing data in form of a root thread execution data record and a set of linked thread execution data records, all containing method list entries is incrementally created by the event correlator 112 out of received transaction events 107 according to the teachings of U.S. Pat. No. 8,234,631. A detailed description of the correlation process can be found there.

Figure 3:
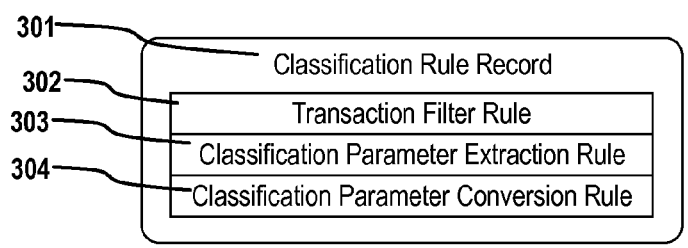
FIG. 3 shows a classification rule record which may be used to store a classification extraction rule, which may be used to extract transaction classification data out of transaction tracing and monitoring data.

A classification rule record 301 which may be used to extract classification data out of end-to-end transaction traces is shown in FIG. 3. Such a classification rule 301 may contain but is not limited to a transaction filter rule 302 which may be used to filter transactions for which the classification rule record can be applied, a classification parameter extraction rule 303, describing a way to extract transaction parameters like specific method parameter values of specific method calls, and a classification parameter conversion rule 304 describing a way to convert transaction parameters extracted according to the classification parameter extraction rule into a classification value.

An exemplary classification rule record to extract a transaction classification value out of the URL of an incoming HTTP request may be defined as follows. The transaction rule filter may filter transactions with a root thread execution data record having a root level monitored method (i.e. the first monitored method executed by the thread) dedicated to the handling of an incoming HTTP request. The classification parameter extraction rule would select the parameter value of the top level method of the initial thread execution of the transaction that provided the URL of the HTTP request and provide it as classification parameter. The classification parameter conversion rule may extract and concatenate server name and path of the URL and return it as classification.

Figure 4:
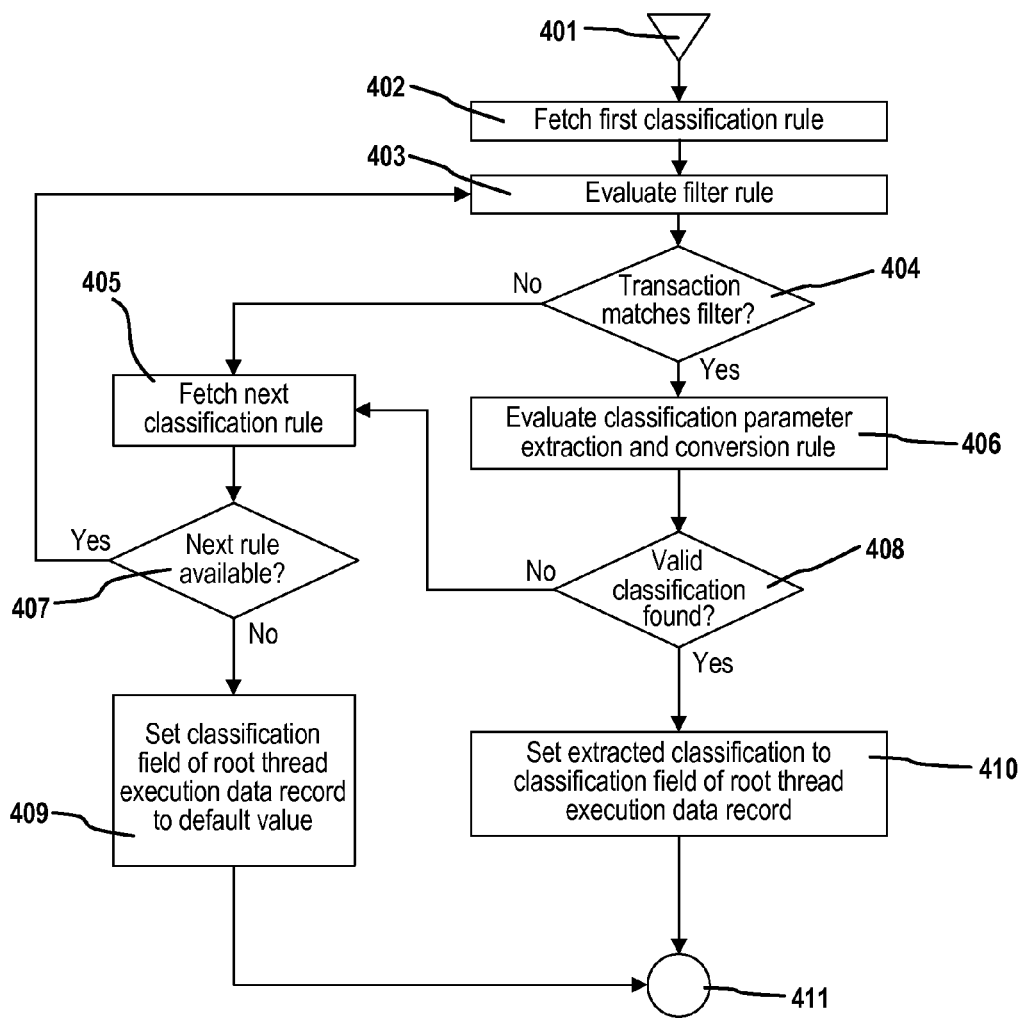
FIG. 4 depicts the process of extracting classification data from transaction tracing and monitoring data using a set of classification extraction rules.

FIG. 4 shows the process to determine the classification of an incoming end-to-end transaction as performed by the transaction classifier 113.

The process starts with step 401, when the transaction classifier 113 receives a new transaction trace. Subsequent step 402 fetches the first classification rule record 301 from the classification rule repository 115 and step 403 evaluates the transaction filter rule 302 to check if the classification rule record matches the received transaction. In case the evaluation rejects the transaction, the process continues with step 405 which fetches the next classification rule record. In case a next classification rule is available, the process continues with step 403. Otherwise, step 409 applies a default classification value to the transaction and the process ends with step 411. The default classification value may be an empty string or a string "<default>" to distinguish such transaction traces from successfully classified transactions. If step 403 determines that the transaction trace matches the filter rule 302, the process continues with step 406, which evaluates the classification parameter extraction rule 303 and the classification parameter conversion rule 304 to create a valid transaction classification. In case no valid classification value could be determined, the process continues with step 405 to fetch the next classification rule record. Otherwise, the process continues with step 410, which applies the extracted classification to the classification field 203 of the root thread execution data record 201. The process then ends with step 411.

Figure 5:
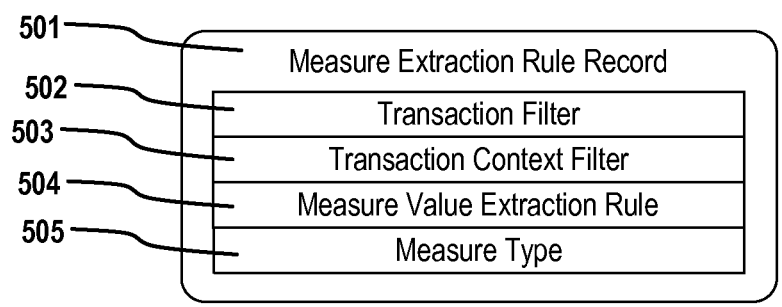
FIG. 5 shows a measure extraction rule record which may be used to store a measure extraction rule that is used to extract measure data from transaction tracing and monitoring data.

A measure extraction rule record 501, which may be used to determine which measures should be extracted from transaction traces is shown in FIG. 5. Such measure extraction rules may extract measures from specific method executions reported by a transaction trace. Alternatively, measure extraction rules may extract statistical data of all method or thread executions forming a transaction trace, like the number of thread executions of a transactions, the number of all method calls, calls of a specific method identified by method name, name of the class declaring the method and method parameters, number of exceptions thrown or caught during transaction execution.

A measure extraction rule record 501 may contain but is not limited to a transaction filter 502 which is used to determine if a measure extraction rule should be evaluated for a specific transaction trace, a transaction context filter 503, defining transaction context parameters that have to be met for the measure extraction, like nesting level of a method from which measures should be extracted, method parameters or parent/child relationships of the thread executing the method, a measure value extraction rule, defining which performance measure should be extracted from captured data describing the method execution or which method executions or exception count should be calculated, and a measure type 505, describing the kind of extracted measure, like "total response time", "exception count" etc.

An exemplary measure extraction rule 501 dedicated to extract the total response time of transactions initiated by incoming HTTP requests would e.g. provide a transaction filter for transaction traces with a root thread execution data record 201 with a top level method list entry describing a method to handle incoming HTTP requests. Examples for such methods used by the servlet framework provided by Oracle Java™ would be methods like "doGet" declared by class "java.servlet.http.HttpServlet" and derived classes.

The transaction context filter 503 would specify that the top level thread execution of the transaction represented by its root thread execution data record 201 should be examined, and of this data record, the top level method list entry 220 should be selected, which initially received the HTTP request and which returned the corresponding HTTP response.

The measure value extraction rule 504 would define to extract the execution time of the method execution identified by the transaction context filter 503 and provide it as a measure. The value of the measure type would e.g. be "HTTP response time" to indicate that the time to create a corresponding HTTP response for a received HTTP request is measured.

Figure 6:
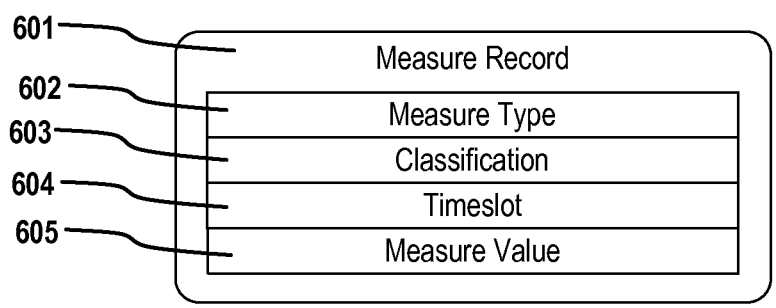
FIG. 6 shows a measure record which may be used to store measure data extracted from transaction tracing data together with corresponding transaction classification data.

Measure records 601, which may be used to store measures extracted from transaction traces according to measure extraction rule records 501, are shown in FIG. 6. A measure record 601 may contain but is not limited to a measure type 602 identifying the kind of the measure, a classification 603 as derived by the transaction classifier from the transaction trace described by the measure record, a timeslot 604 representing the point in time or time range for which the measure value 605 is valid, and a measure value 605 containing the extracted numerical measure value.

Figure 7:
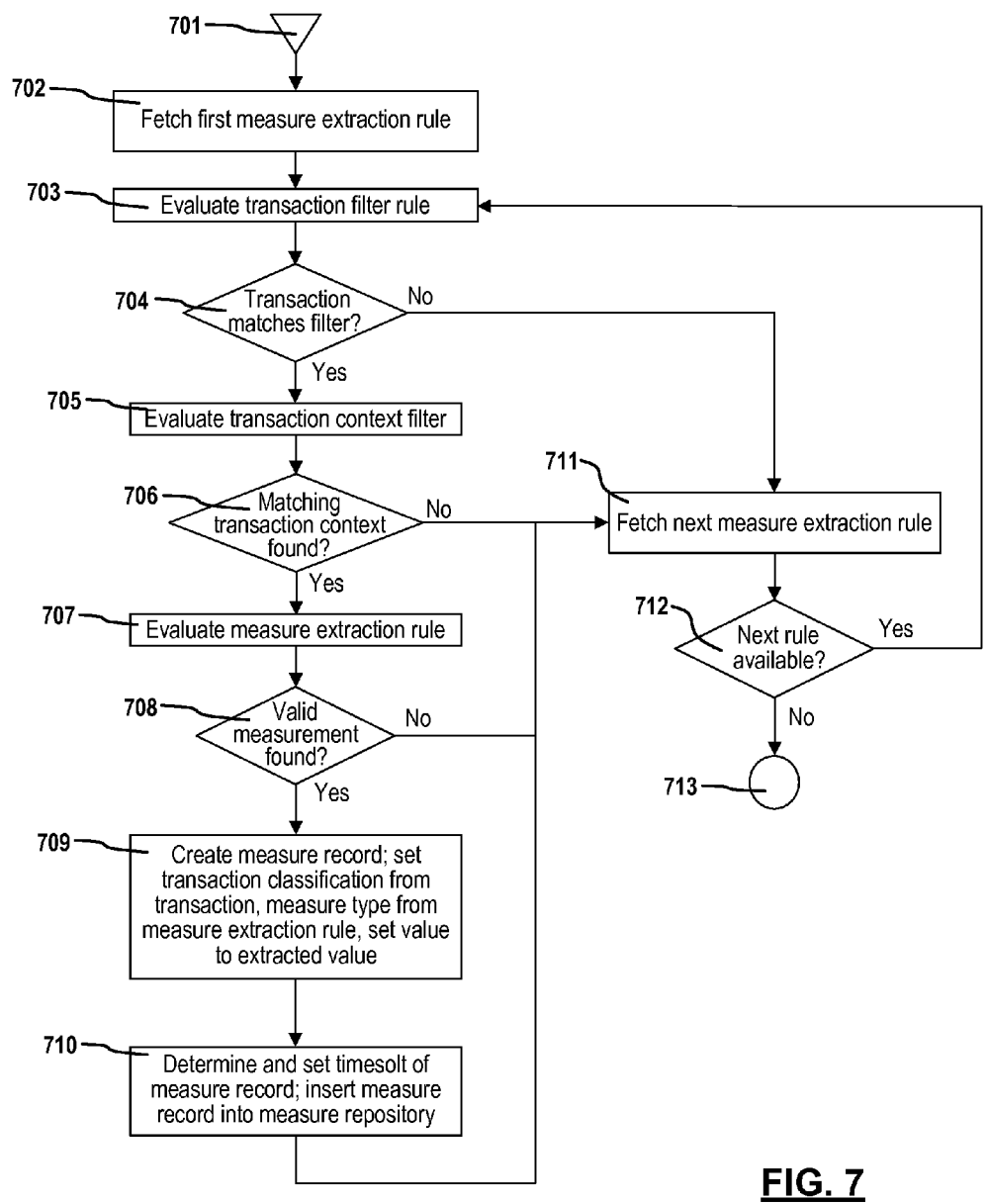
FIG. 7 shows the process of extracting measure data from classified transaction tracing and monitoring data and storing it in corresponding measure records together with corresponding transaction classification data.

The process of extracting measure records 601 from classified transaction traces as performed by the measure extractor 116 is described in FIG. 7.

The process starts with step 701, when the measure extractor 116 receives a classified transaction trace and continues with step 702 that fetches the first measure extraction rule record 501 from the measure extraction rule repository 118. Subsequent step 703 evaluates the transaction filter 502 on the transaction trace to determine if the fetched measure extraction rule record 501 can be applied to the received transaction trace. In case the evaluation results in no match, the process continues with step 711 which fetches the next measure extraction rule record 501. In case no next rule is available, the process ends with step 713. Otherwise processing continues with step 703.

In case transaction filter evaluation performed by step 703 indicates a match, the process continues with step 705 and evaluates the transaction context filter 503 to find a matching transaction context. In case no matching transaction context was found, processing continues with step 711. Otherwise, the process subsequently executes step 707 to extract a measure value according to the measure value extraction rule 504 of the measure extraction rule record 501. In case no appropriate measure value could be extracted, the process continues with step 711. Otherwise, step 709 is executed which creates a new measure record 601. The measure type 602 is set to the measure type 505 of the currently processed measure extraction rule record 501, classification 603 is set to the classification 203 of the root thread execution data record 201 of the received transaction trace and the measure value 605 is set to the measure value extracted by step 707. Following step 710 determines the timeslot 604 of the measure record, e.g. using the start or end time of the transaction in case the measure represents the transaction trace as a whole, like the number of exceptions or the number of method calls, or the start or end time of a specific method execution in case the measure describes a specific method execution. To ease storage, management and processing of measures, a monitoring and alerting system may use a discrete time system, which segments continuous time into discrete segments or timeslots. Measures extracted from transactions describe events like method executions performed on arbitrary points in time. This measure timestamps have to be assigned a corresponding timeslot in case of a discrete time system. After step 710, the process continues with step 711.

Measure distribution records 801, which may be used to describe the statistical distribution of measures of a specific type and classification, are described in FIG. 8*a*. A measure distribution record 801 may contain but is not limited to a measure type 802 describing the type of measures on which the distribution description is based, a classification 803 describing the transaction trace class for which the measure distribution is calculated, a distribution type describing the statistical kind of distribution according to the statistical type of measure value, which may be a distribution type based on discrete events, like the occurrence of failed transaction, or a distribution based on continuous measures, like execution times, a number of samples field 805 and a list of distribution parameters 806. The distribution type 804 may be used to choose the appropriate statistical test to compare different measure distribution records of the same measure type, classification and distribution type. Number of samples 805 may influence the accuracy and confidence of such a test.

A distribution parameter record 810 as described in FIG. 8*b* may be used to describe a parameter of a concrete measure distribution and may contain but is not limited to a type 811 identifying the type of the parameter, like mean of the distribution, min value, max value, range, expected failure rate or a specific quantile and a value 812 containing the concrete distribution parameter value.

A statistical statement record 901, which is used to store data describing the result of a statistical test that compared two different measure distribution records of the same measure type 802, classification 803 and distribution type 804, is shown in FIG. 9.

Such statistical tests compare a measure distribution record 801 describing a distribution of a specific measure type and classification for a historic reference period or baseline with a measure distribution record 801 describing the current statistical behavior of a measure with the same measure type and classification.

A statistical statement record 901 may contain but is not limited to a measure type 902, and a classification 903 identifying type and classification of the measures of the compared measure distribution records, a test type 904 identifying the performed statistical test which may e.g. indicate that a test to identify statistically significant deviation of a specific quantile has been performed, a timeslot 905 identifying the point in time when the test was executed, and an anomaly indicator 906 indicating the detected deviation relative to the baseline. The anomaly indicator may indicate a current statistical value significantly above or below the baseline, significantly near the baseline or an insignificant test result, where an insignificant test result indicates statistical uncertainty if an anomaly occurred or not.

A conceptual description of the processes for statistic based anomaly detection is shown in FIG. 10. The cyclical update of historic baseline data is shown in FIG. 10*a* and the update of statistic data describing the current distribution of the measure values and the statistical test to detect deviations between current and baseline distribution is shown in FIG. 10*b*. Individual statistical baseline and current data is calculated for each measure type and classification.

The baseline update process starts with step 1001 when a specified time after the last baseline update (e.g. 24 hours) has been elapsed. Following step 1002 fetches historic measures for the new baseline period from the measure repository 117. Examples of a baseline period include all measures from yesterday or all measures from the same day last week. Afterwards step 1003 calculates statistical distribution parameters representing the statistical measure value distribution of the new baseline period. Such distribution parameters may contain but are not limited to the mean value of the distribution, its minimum or maximum value, standard deviation, expected value, or specific quantiles like the 0.5 or 0.9 quantile. The calculated distribution parameters may be modified by applying a tolerance value. The applied tolerance value changes the baseline distribution parameters in a way to describe a slightly weaker performance behavior as calculated to make the statistical analysis process based on the baseline parameters more resistant against false positive alerts. The tolerance value may be calculated as a maximum of an absolute tolerance, a relative tolerance and a parameter specific tolerance.

The absolute tolerance is used to avoid statistically correct but irrelevant alerts for very fast transactions. As an example, if an end-to-end transaction with baseline response time of 10 ms shows a current response time of 20 ms or 25 ms, this represents a statistically significant performance decline, but for real world users such performance degradations on a whole end-to-end transaction are barely noticeable. By e.g. applying an absolute tolerance value of 50 ms and raising the baseline from 10 ms to 60 ms, such irrelevant alerts are avoided.

The relative tolerance is calculated by increasing a calculated parameter value by a specific percentage.

The parameter specific tolerance may as an example, for a quantile based parameter value use a less restrictive quantile than the calculated quantile.

Exemplary values for absolute, relative and parameters specific tolerance for a quantile based parameter would be 50 ms, 20% and 0.05. For a calculated or estimated 0.9 quantile of 300 ms, the absolute tolerance level would be the calculated 300 ms plus the 50 ms of the absolute tolerance resulting in 350 ms, the relative tolerance level would be the measured 300 ms plus 20% of the measured value resulting in 360 ms. The parameter specific tolerance value for quantile parameters would be applied by using the quantile with the index of the original quantile 0.9 plus the parameter specific tolerance value 0.05 which would result in using the value of quantile 0.95 instead of the value of quantile 0.9. The calculated or estimated value of quantile 0.95 may e.g. be 400 ms.

As the maximum of the three calculated tolerance levels is 400 ms, the value 400 ms is used as the new baseline parameter value.

After the baseline values were calculated and adapted by step 1003, the values 812 of the distribution parameter records 810 of the corresponding measure distribution record 801 is updated with the adapted values in step 1004 and the process ends with step 1005. The field number of samples 805 is set to the number of measure records 601 representing the new baseline period.

For new installed monitoring systems, the measure repository may during the first hours or days not contain sufficient historic measurement data to cover a full baseline period. In such situations, the used baseline window may be gradually increased until historical data for a full baseline time window is available.

The statistical processing of new measure records 601 by the anomaly detector 119 to update corresponding measure distribution records 801 describing the current statistical distribution of measure values for a specific measure type and classification, and to perform statistical tests against corresponding statistical baseline parameters is shown in FIG. 10*b*.

The process starts with step 1010, when the anomaly detector 119 starts processing a new measure record 601. Subsequent step 1011 fetches the measure distribution record 801 with measure type 802 and classification 803 matching the measure type 602 and classification 603 of the new measure record from the current distribution repository 120. Step 1012 recalculates and updates values 812 of the distribution parameter records 810 of the measure distribution record 801 representing the current distribution of the measure values, considering also the measure value 605 received with the new measure record 601. This recalculation may contain but is not limited to recalculate mean, minimum and maximum values and to update quantile estimations, considering the new measure. The field number of samples 805 is incremented.

Following step 1013 fetches the corresponding measure distribution record 801 representing the baseline distribution from the baseline repository 122 and step 1014 performs a statistical test appropriate for the measure type of the new received measure record. The test analyzes both baseline and current distribution parameters to determine with statistical significance if the current distribution shows a weaker, better or equal performance behavior compared with the baseline distribution. In case of estimated statistical parameters, like e.g. quantiles, the number of samples 805 and a desired confidence level may be used to calculate a confidence interval of the estimated value. The corresponding "real value" of an estimated value is within the confidence interval with a probability defined by the confidence level. Tests based on such estimated statistical parameters may also consider this confidence interval. An absolute number of required samples may be required for both exactly calculable parameters like mean and estimated parameters. In case either number of samples 805 of baseline or current distribution is below this absolute threshold, the statistical test indicates an insignificant result.

The statistical test may produce a statistically significant result indicating slower, faster or equal current behavior compared to the baseline or an insignificant result, if e.g. the number of baseline or current samples is too low.

Following step 1015 creates a statistical statement record 901 and sets measure type 902 and classification 903 according to the corresponding values of the received measure record 601. The test type 904 is set according to describe the statistical test performed in step 1014. Example test types would be "0.9 quantile test", "0.5 quantile test" for tests detecting a deviation of specific quantiles of transaction response times or "Poisson test" for a test detecting deviations of transaction failure rates.

Subsequent step 1016 sets the anomaly indicator 906 of the created statistical statement record 901 according to the result of the test performed in step 1014, determines and sets the timeslot of the create statistical statement record.

In case the test produced a significant result, the distribution parameter records 810 of the measure distribution record 801 describing the current distribution are reset to clear data describing the current distribution. Future received measure records 601 are used to incrementally update the now reset measure distribution record 801 to describe a distribution considering the time period since the last significant test result. Also data used for parameter estimations are reset and number of samples is set to 0. If multiple statistical tests are performed for a specific measure type/classification combination, which may become significant on different points in time, separate, independent measure distribution records 801 describing the current measure distribution must be maintained for each test which can then also be reset independently.

In case step 1017 identifies that the test produces no significant result, step 1018 is omitted.

Subsequent step 1019 inserts the created statistical statement record 901 into the statistical statement repository 121 for further processing. The process ends with step 1020.

Steps 1011 to 1012 of this process which update the measure distribution record describing the current distribution of a measure, have to be executed on every received measure record, whereas steps 1013 to 1020 may be executed in a decoupled, cyclical way, that e.g. performs the statistical testing only once per minute to save CPU resources on the monitoring node.

An alert transition rule 1101 which may be used by the alert processing and visualization module 123 to decide when to raise or lower an alert, based on incoming statistical statement records 901, is shown in FIG. 11.

An alert transition rule 1101 may contain but is not limited to a measure type 1102 identifying a specific kind of measure, a specific test type 1103, a classification 1104 and a current alert state 1105 for which the alert transition rule is valid. Further, an alert transition rule 1101 may contain a target alert state 1106 specifying the state of an alert if the rule is applied, and a set of transition prerequisites 1107 defining the conditions which have be fulfilled to apply the alert state transition. The classification 1104 of an alert transition rule 1101 may in some cases be set to a value indicating that it is valid for all classifications to provide broader but application and classification independent alert transition rules.

An alert record 1201 representing an alert raised by the alert processing and visualization module 123 based on incoming statistical statement records and matching alert transition rules 1101 is described in FIG. 12.

An alert record 1201 may contain but is not limited to a measure type 1202, a test type 1203 and a classification 1204 to identify the measure on which the alert is based and the statistical test which was used to detect the condition that triggered the alert. Additionally, an alert record may contain an anomaly indicator 1205 identifying the detected anomaly condition, an alert start time 1206 and an alert end time 1207 describing the duration of the condition that caused the alert.

The processing of incoming statistical statement records 901 to determine if alerts should be raised or lowered, as performed by the anomaly alerting and visualization module 123 is shown in FIG. 13.

The process starts with step 1300, when a new statistical statement record 901 is received. Subsequent step 1301 queries the alert repository 125 for an open alert record 1201 with the same measure type 1202, classification 1204 and test type 1203 as the received statistical statement record 901. An alert record is open, when the alert end time 1207 of the record is not set. In case a matching open alert record is found, the process continues with step 1303 which checks if anomaly indicators of the incoming statistical record and the existing alert record match. In case of a match no update to the alert record is required and the process ends with step 1312.

Otherwise, step 1304 fetches matching statistical statement records from the statistical statement repository 121 that are not related to an earlier alert to get the history of statistical statements for this measure and this test type which is not covered by an earlier alert record. This may be performed by selecting statistical statement records with matching measure type, classification and test type that are younger than the youngest alert end time 1207 of an alert record with matching measure type 1202, test type 1203 and classification 1204.

Subsequent step 1305 fetches from the alert rule repository 124 alert transition rules 1101 with matching measure type 1102, test type 1103 and classification 1104 and with a current alert state 1105 matching the anomaly indicator 1205 of the open alert record found in step 1301. The transition prerequisites of the fetched alert transition rules are evaluated to determine if an alert update is required. Such a transition prerequisite may e.g. define that a raised alert indicating a performance anomaly can only be lowered after a minimal number of statistical statements indicating normal performance behavior was received.

In case alert transition rule evaluation indicates no required update of the alert record 1201, the process ends with step 1312. Otherwise, the alert record is updated in step 1307 and the change of the alert state is notified. In case the alert state transition rule evaluation resulted in an end of the anomaly described by the alert record, also the alert end time 1207 is set. The process ends with step 1312.

In case step 1301 finds no matching open alert record 1201 in the alert repository 125, the process continues with step 1308, which fetches matching statistical statement records 901 from the statistical statement repository 121 that are not covered by older, closed alert records. Subsequent step 1309 fetches alert transition rules 1101 with matching measure type 1102, test type 1103 and classification 1104, and a current alert state 1105 indicating no existing open alert record.

The fetched alert transition rules are evaluated to determine if a new alert record should be created. In case no new alert record is required, the process ends with step 1312. Otherwise, step 1311 is executed which creates a new alert record 1201 with data form the incoming statistical statement record, and sets its alert start time 1206 to the current time. The alert creation is notified and the new alert is inserted into the alert repository 125.

FIG. 14 compares variants of probability density functions of end-to-end transaction response times, similar to measured and recorded density functions of transaction response times of monitored real end-to-end transactions.

Most perceived distributions show a statistical skewness to the right, where the majority of measures is faster than the mean value of the distribution, and only a small amount of outliers is present with relatively slow response times.

FIG. 14a shows a normal performance situation 1401, with distribution parameters 0.5 quantile 1404a, mean 1405a and 0.9 quantile 1406a.

FIG. 14b shows a situation where the performance of the majority of requests remains unchanged, but the number of outliers with very slow response times is increased 1402. Distribution parameter 0.5 quantile 1404b is barely influenced by the outliers, but the mean value 1405b shows sensibility against those outliers and changes significantly. As a consequence, anomaly detection based on a mean value alone would in such (frequent) situations tend to create false positive alerts. The value of 0.9 quantile 1406b which monitors the slowest transactions is increased as expected.

FIG. 14c shows a situation where not the performance of a small set of individual transactions, like outliers, is decreased, but the performance of the majority of transactions 1403. In this situation, both the 0.5 quantile 1404c and the mean 1405c show a deviation to the normal situation 1401. As the set of outliers with extremely slow transaction execution times is not changed, the 0.9 quantile 1406c remains relatively stable.

A test based on a 0.5 quantile or a quantile near the level of 0.5 may be used to determine the performance situation of the majority of executed transactions compared to the baseline. A test based on the 0.9 quantile or near this level, may be used to determine the performance situation of outliers.

The process of estimating quantiles describing a baseline distribution is shown in FIG. 15. The nature of exact quantile calculation which requires a sorted list of all measurements, the large amount of measures, and the requirement to calculate quantiles in near-real-time, does not allow an exact calculation. An accurate estimation method that requires a limited amount of memory and that only requires examining each measure once for the estimation is needed. Additionally, computational complexity and processing time to incorporate a new measure should be constant. I.e. adding a new measure to an estimator already considering 10.000 other measures should take the same time as adding it to an estimator only considering 100 other measures. Algorithms that fulfill these requirements are called one-pass, space-efficient quantile estimation algorithms.

The p-square algorithm (for a detailed description see e.g. http://www.cs.wustl.edu/~jain/papers/ftp/psqr.pdf) is such an algorithm and may be used by described embodiments to estimate quantiles for baseline and current distributions. Various other quantile estimation algorithms that fulfill aforementioned requirements are available and known in the art, like the algorithm proposed by John C. Liechty et. al., see e.g. http://www.personal.psu.edu/users/j/x/jxz203/lin/Lin_pub/2003_StatComp.pdf. Other quantile estimation algorithms may be used by embodiments of the current disclosure without leaving scope and spirit of the application, as long as they fulfill the aforementioned requirements for an quantile estimator that operates on large sets of data and should provide quantile estimations in real-time or near real-time.

The process starts cyclically with step 1501, if e.g. a specific time since the last baseline update is elapsed. Subsequent step 1502 fetches the measure records 601 representing the new baseline period and following step 1503 uses an implementation of a quantile estimator like a p-square algorithm to perform a fast and memory efficient calculation of the quantile estimations describing the baseline distribution. The quantile estimator may store selected data describing the distribution in form of supporting points describing an estimated curve progression of the quantile function. The data stored by the quantile estimator also allows the addition of different quantile estimations representing different time frames to one quantile estimation representing the combined time frame. This may be used to optimize baseline quantile calculation if a set of quantile estimations describing smaller time frames covering the whole baseline timeframe is already available. It allows e.g. to add 24 quantile estimations describing different hours of a day into one quantile estimation describing the whole day.

After calculation of the quantile estimation is finished, the process continues with step 1504 which stores the quantile estimations in corresponding measure distribution records 801. The process ends with step 1505.

The baseline update process is performed for each measure type and classification.

The update of quantile estimations describing the current measure distribution of measures with a specific measure type and classification is shown in FIG. 16.

The process may be executed as part of step 1012 of the process described in FIG. 10b, it is started with step 1601 when a new measure record is received and the matching measure distribution record 801 is fetched from the current distribution repository 120. Subsequent step 1602 adds the new measure value to the quantile estimator, which uses the new measure to adapt its internal representation of the quantile function to reflect the new received measure. Following step 1603 stores the update quantile estimation data in the measure distribution record 801. The process then ends with step 1604.

The process of comparing a baseline and a current measure value distribution based on estimated quantile values is shown in FIG. 17.

The process starts with step 1701 when an updated measure distribution record 801 describing a current measure distribution, containing updated quantile estimations is available (e.g. after execution of the process described in FIG. 16). Subsequent step 1702 fetches the matching measure distribution record 801 describing the corresponding baseline distribution from the baseline repository 122 and then fetches the value for the quantile used by the test from the measure distribution record 801 describing the baseline distribution.

Following step 1703 applies absolute, relative and parameter specific tolerances to the baseline quantile value as described in step 1003 of the more generic process 10a. In the generic description, tolerances are already calculated and applied on baseline updates and a baseline with added tolerances is stored. In the quantile specific processing, plain baseline data is created and stored without added tolerances. This allows using the same baseline quantile estimation data for different quantile tests using different tolerance values. Both variants are possible without leaving the spirit and scope of the current disclosure.

Following step 1704 fetches the quantile value (e.g. 0.5 quantile or 0.9 quantile) required for the test from the measure distribution record 801 describing the current measure distribution.

Step 1705 evaluates if number of samples 805 of current and baseline distribution record 801, and the distance between expected quantile (=baseline quantile with applied tolerance) and the current quantile allow a significant test result. The smaller the difference between expected and observed quantile, the more samples are required to determine a statistically significant difference between them.

In case number of samples and compared quantile values allow testing, step 1705 continues with calculating a confidence interval for the estimated current quantile, defining a range in which the real current quantile lies with a specific, defined probability (e.g. 99%). The size of the confidence interval depends on the number of samples 805 of current and baseline distribution, and the desired confidence (probability that the real value lies within the interval). In case the expected baseline quantile value lies outside of the confidence interval of the current quantile value, a significant deviation was detected and the process continues with step 1707.

Step 1707 creates a statistical statement record indicating a deviation between baseline and current distribution. In case the higher bound of the confidence interval of the current quantile is lower than the baseline quantile with applied tolerance, the current quantile value is below the baseline with applied tolerance with required statistical certainty, and a statistical statement 901 indicating a normal performance behavior is created. In case the lower bound of the confidence interval of the current quantile is higher than the baseline quantile value with applied tolerance, the current quantile is higher than the baseline with required statistical certainty, and a statistical statement record indicating abnormal, degraded performance behavior is created.

Subsequent step 1712 clears the quantile estimator of the current distribution to start new quantile calculations not considering old measurements. The process then ends with step 1713.

In case step 1705 either detects that there is no significant deviation between current and baseline quantile, e.g. the baseline quantile with applied tolerance lies within the confidence interval of the current quantile, or detects that the number of samples is not sufficient for a significant test, the process continues with step 1708, which evaluates the number of considered samples again to determine if a test result indicating a current quantile value being equal to the baseline quantile with applied tolerance is legitimate.

In case a result indicating an equal current and tolerance adapted baseline quantile is justified, a statistical statement record 901 with an anomaly indicator indicating a current distribution on the edge of the baseline is created by step 1710. The process then continues with step 1712 to clear the quantile estimation data for the current distribution.

In case of insufficient samples, the process continues with step 1711 by creating a statistical statement record 901 indicating an insignificant test result. In this case, the quantile estimation data for the current distribution is not reset and the process ends with step 1713.

A situation where performance anomaly detection based on a single quantile estimator for a specific quantile may detect a performance anomaly with undesired delay, and an approach to overcome this problem by using two independent estimators, is shown in FIG. 18.

Both FIG. 18a and FIG. 18b shown the same performance situation, where the measured performance gradually approaches the baseline and then stays near the baseline for a considerable time. Afterwards, abrupt performance degradation is observed.

FIG. 18a shows the detection of this degradation with a testing process based on a single quantile estimator, which is delayed due to a quantile estimator for the current distribution considering a long measure history and thus is unable to react fast on sudden changes of the performance situation.

A baseline level 1802, describing the tolerance modified value of a specific estimated quantile from the baseline distribution is tested against a corresponding estimated quantile value 1803 describing the distribution of the current measures 1801.

The current measures 1801 and the corresponding estimated quantile values gradually become slower, until a statistical test according to the process described in FIG. 17 detects that baseline quantile and current quantile are equal 1804a. Afterwards, measure values and current baseline stay very near to the baseline level for a considerable time. As a consequence, the test is unable to produce another significant result to reset the estimation data, because the number of samples is too low for the relative small difference between current and baseline quantile estimation value. The estimator aggregates a large amount of samples confirming the last significant test result of a current quantile equal to the baseline, which causes the estimator to react slow on abrupt performance changes of the original measured values as shown in 1809.

The quantile describing the current distribution only rises slowly after the abrupt change, causing a delayed detection of the performance anomaly.

FIG. 18b shows the same situation with an enhanced detection mechanism using two different quantile estimators being reset on different events. The enhanced mechanism detects such abrupt performance changes faster.

Same as with the single quantile estimator testing process, the first quantile test gets significant 1804a as the quantile estimated by the first estimator 1803 and the measures 1801 approach the baseline 1802. However, on significance, also the second quantile estimator gets reset. Tests based on the second estimator are performed cyclically, e.g. every minute, 1805a to 1805e, and the second estimator is reset if the test generates the same result as the last significant test using the first estimator 1804a. During unchanged performance behavior of the measure values, the quantile estimations of the second estimator 1807a to 1807e are relatively similar to the estimations of the first estimator. However, after abrupt performance degradation 1809, the second quantile estimator is fast reacting and quickly provides a quantile value significantly over the baseline 1808, which is detected and notified 1806.

FIG. 19 describes processes that may be used to implement a statistical testing system based on two different quantile estimators as drafted in FIG. 18.

A process that additionally updates quantile estimation data for the second, fast quantile estimator on incoming measure records is shown in FIG. 19a.

The process starts with step 1901, when a new measure record is received, and a measure distribution record used to store the fast quantiles is fetched. Similar to the process described in FIG. 16, the new measure value is added to the estimation base of the quantile estimator (see step 1902) and afterwards the update quantile estimation data is stored in the measure distribution record described by the fast quantile estimator 1903. The process then ends with step 1904.

A process that cyclically performs a statistical test both considering slow and fast quantile estimator is shown in FIG. 19b.

The process is started with step 1910 when a defined time (e.g. 1 minute) since the last test execution is elapsed. Subsequent step 1911 performs the test described in steps 1705 and 1708 of FIG. 17 to compare a tolerance adjusted baseline quantile with a quantile describing a current distribution for the quantiles of both estimators. In case the test for the slow quantile is significant, the process continues with step 1913 which creates and stores a statistical statement record according to the test result using the slow estimator. Subsequent step 1914 resets quantile estimation data for slow and fast quantile estimator and the process ends with step 1918.

In case the test performed in step 1911 provides no significant result for the slow quantile estimator, the process continues with step 1915, which checks if the test using the fast quantile estimator is significant and the test result is different to the last significant test result using the slow quantile estimator. In this case, the process continues with step 1913 which creates and stores a statistical statement record reflecting the test result using the fast quantile estimator.

In case the test using the fast quantile estimator is either not significant or the test result is equal to the last significant test result using the slow quantile estimator, the process continues with step 1916, which checks if the test result of the fast quantile estimator equals the last significant test result using the slow quantile estimator, regardless if the test using the fast estimator is significant or not. In case both results are equal, the estimation base of the fast quantile estimator is cleared in step 1917. The process ends with step 1918.

A failure detection rule record 2001 which may be used to determine if a received end-to-end transaction trace describes a failed transaction execution is shown in FIG. 20. A failure detection rule record may contain but is not limited to a transaction filter rule 2002, which may be used to determine if a specific transaction trace can be analyzed by the rule and a failure condition extraction rule 2003, which determines the conditions that identify a failed transaction. An exemplary failure detection rule dedicated to analyze end-to-end transaction traces initiated by HTTP requests may have a transaction filter rule for transactions with a first method execution dedicated to handle an incoming HTTP request. The failure condition extraction rule may examine the response code returned by the method that handled the incoming HTTP request and provided the corresponding response. In case the return code indicates a server internal error, the end-to-end transaction may be flagged as failed. Various other failure detection rules 2001 may be defined, e.g. based on uncaught exceptions detect in a monitored transaction, or the detection of a specific method call in a transaction trace know to create an error response.

The process of determining if an incoming end-to-end transaction is failed, as performed e.g. by the transaction classifier 113, is shown in FIG. 21.

The process starts with step 2101, when a new transaction trace is received. Subsequent step 2102 fetches the first failure detection rule and following step 2103 evaluates the transaction filter rule 2002. In case the transaction does not match, the process continues with step 2105 to fetch the next failure detection rule. In case no other rule is available, the failure indicator 206 of the transaction trace is set to indicate a successful transaction in step 2109 and the process ends with step 2111. In case another failure detection rule is available, the process continues with step 2103.

In case the transaction matches the filter rule 2002, the process continues with step 2104, which evaluates the failure condition extraction rule 2003. In case no failure is detected, the process continues with step 2105. Otherwise, step 2110 is executed, which sets the failure indicator 206 to indicate a failed transaction and the process ends with step 2111.

The process of measuring the number of monitored transactions and the number of failed monitored transactions as e.g. performed by the measure extractor 116 is shown in FIG. 22.

The process starts with step 2201, when a new classified and failure checked transaction trace arrives at the measure extractor. Subsequent step 2202 creates a measure record 601, sets its measure type 602 to indicate a transaction count measure, its classification 603 to the classification of the transaction trace and sets the measure value 605 to 1, indicating one additional transaction.

Following step 2203 checks if the failure indicator 206 indicates a failed transaction. In case of a failed transaction, step 2204 is executed, which creates a measure record 601, sets the measure type 602 to indicate a failed transaction count measure, classification 603 to the classification of the transaction trace and sets the measure value 605 to 1, indicating one additional failed transaction.

Step 2205 is executed whether the transaction is failed or not. It determines and sets the time slot 604 of the previous created measure records 601 and inserts them to the measure repository 117. The process ends with step 2206.

An alternative processing could create one measure record per classification and times slot. In case a new transaction is processed, the measure record for the current classification record and time slot is fetched, and its measure value is incremented by one.

The process of updating the measure distribution records 801 representing the failure rate baselines for all classifications is shown in FIG. 23.

The process is started with step 2301, when a specific time since the last baseline update is elapsed. Typical baseline update intervals are one hour, 12 hours or one day. Following step 2302 fetches measure records 601 with measure type transaction count and failed transaction count for the current classification and with a time slot in the new baseline period. Typical base line periods are one hour, 12 hours or one day.

Following step 2303 determines the number of transactions and failed transactions in the new baseline period by evaluating the fetched measure records and calculates the raw failure rate of the baseline by dividing the failed transaction count by the transaction count.

Step 2304 applies an absolute and a relative tolerance value to the raw failure rate and subsequent step 2305 analyzes transaction count and failure rate to determine the appropriate statistical distribution model for the baseline. In case of a high number of transactions and a low failure rate, a Poisson distribution may be chosen. Otherwise a Binomial distribution is used.

The selected distribution model is parameterized in step 2306 with the measured transaction count and failed transaction count to describe a distribution showing the same failed transaction count as the baseline at the same number of transactions as the baseline. Following step 2307 uses the parameterized distribution model and a confidence level specified for the failure rate to calculate a confidence interval for the baseline failure rate.

Step 2308 fetches the measure distribution record 801 for the current classification and for the failure rate distribution from the baseline repository 122 and subsequent step 2309 stores the upper bound of the confidence interval calculated in step 2307 as new baseline failure rate in the measure distribution record. The process then ends with step 2310.

The process which determines the current failure rate distribution, and tests if the current failure rate deviates significantly from the baseline failure rate is shown in FIG. 24.

The process is performed cyclically with an execution frequency that provides fast notifications, but which also provides a high probability that monitored transaction execution have been performed and finished between two test executions. An execution frequency of one execution per minute represents a good compromise. The process is performed for all classifications.

The process starts with step 2401, when the time between two tests is elapsed. Subsequent step 2402 fetches the measure distribution record 801 for failure rate testing for the current classification describing the current failure rate distribution from the current distribution repository 120. The measure distribution record may contain the value of the transactions and failed transactions performed since the last significant test result and up to the last test execution. Following step 2403 fetches all measure records 602 for measure type 602 "transaction count" and "failed transaction count" with a time slot 605 within the time since the last performed failure rate test, e.g. last execution of this process, and for the current classification from the measure repository 117. Step 2404 uses the fetched measure records to determine the number of transactions and failed transactions received since the last test execution, and then performs a corresponding update of the measure distribution record fetched in step 2401 by adding the number of transactions and failed transactions since the last test to the number of transactions and failed transactions stored in the measure distribution record. Following step 2405 checks if the number of transactions now stored in the measured distribution record is above an absolute minimum of transactions required for a statistical test. The threshold for sufficient transactions may e.g. be 30 transactions. In case not sufficient transactions have been recorded since the last significant test result, the process continues with step 2406, which creates a statistical statement record indicating an insignificant test and the process ends with step 2407.

If otherwise sufficient transaction executions are available, the process continues with step 2408, which fetches the measure distribution record representing the baseline distribution for failure detection for the current classification from the baseline repository 122. Subsequent step 2409 fetches a matching distribution model for the current failure rate distribution, based on the current number of transactions and the expected failure rate. The distribution model may be selected from a Binominal or a Poisson distribution model. Both distribution models are statistically modelling processes with discrete binary outcome (e.g. transaction failed or passed, see also Bernoulli trial). The only difference between the two models is that the Binominal model provides an exact model and the Poisson model, which is mathematically less complex, provides an approximation assuming an infinite number of samples. If the number of transactions (samples) exceeds a specific threshold, the process switches from a Binominal to a Poisson model. The expected failure rate is the failure rate stored in the measure distribution record 801 describing the baseline failure rate. Following step 2410 parameterizes the selected distribution model with the current transaction count and the baseline failure rate. Parameterizing the selected distribution model with current transaction count and baseline failure rate translates the measured baseline failure rate into a model of a statistical distribution that describes the failure rate of the baseline distribution under the conditions (number of samples) of the currently perceived transaction samples. This parameterized statistical model may be used to compare the observed current failure rate with an expected failure rate derived from the baseline observations.

Subsequent step 2411 calculates a lean confidence interval for the expected failure rate (smaller range), using a specified lean confidence level and a strict confidence interval (larger range) using a specified strict confidence level. Upper and lower bounds of the confidence intervals are used to test against the current failure rate in a way that avoids too early failure rate alerts, and that allows quick lowering of failure rate alerts in case the failure rate falls back to the baseline level. Subsequent step 2412 calculates the current failure rate by dividing the current number of failed transactions by the number of current transactions.

Step 2413 checks if the calculated current failure rate is higher than the upper bound of the strict confidence interval. In case it is higher, the process continues with step 2414 which creates and stores a statistical statement record 901 indicating a failure rate above the baseline for the current classification and subsequent step 2415 resets the current transaction count and current failed transaction count of the measure distribution record 801 describing the current failure rate distribution. The process then ends with step 2416.

In case the calculated current failure rate is not higher than the strict upper bound, the process continues with step 2417, which checks if the current failure rate is between the upper strict and the upper lean confidence level. In this case, the test cannot significantly determine if the failure rate is above or at the baseline and creates a statistical statement record 901 indicating an insignificant test with step 2418, the process ends with step 2419.

In case the current failure rate is not between strict and lean upper confidence level, the process continues with step 2420 which checks if the current failure rate is between the upper and lower lean confidence level. In this case, a statistical statement record 901, indicating a current failure rate at the baseline failure rate level is created in step 2422 and following step 2423 resets the current failure rate distribution description. The process then ends with step 2424. In case the current failure rate is below the lower lean confidence level, the process continues with step 2421 which creates a statistical statement record 901 indicating a current failure rate below the baseline and following step 2423 resets the measure distribution record 801 describing the current failure rate distribution. The process then ends with step 2424.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality. It is understood that grouping of operations within in a given module is not limiting and operations may be shared amongst multiple modules or combined into a single module.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for detecting anomalies in a performance metric associated with monitored transactions of a distributed computing environment, comprising:

capturing, by a sensor instrumented in a monitored application, a plurality of measurement values for a performance metric, where the performance metric is for a transaction executed in part by the monitored application, and the sensor and the monitored application reside on and are executed by a processor of a host computer;

calculating, by the anomaly detector, a current distribution parameter from the plurality of measurement values, where the current distribution parameter is indicative of statistical distribution of the plurality of measurement values for the performance metric during the present period of time;

retrieving, by the anomaly detector, a baseline distribution parameter for the performance metric, where the baseline distribution parameter is indicative of statistical distribution of measurement value for the performance metric during a preceding period of time, where the preceding period of time precedes the present period of time;

detecting, by the anomaly detector, a change in shape of the statistical distribution of the plurality of measurement values for the performance metric during the present period of time by comparing the current distribution parameter to the baseline distribution parameter;

determining whether quantity of the plurality of measurement values exceeds a significance threshold; and detecting an anomaly in the performance metric based on the detected change in shape of the statistical distribution only when the quantity of measurement values exceeds the significance threshold, where the anomaly detector is executed by a processor of a monitoring computer residing across a network from the host computer.

2. The method of claim 1 further comprises detecting an anomaly in response to the change in shape of the statistical distribution exceeding a threshold and generating an alert by the computing device, the alert being generated in response to detecting an anomaly in the performance metric.

3. The method of claim 1 further comprises performing the steps of calculating, retrieving and detecting in part while the transaction is being executed.

4. The method of claim 1 further comprises identifying an anomaly in the performance metric when the current distribution parameter falls outside a tolerance of the baseline distribution parameter.

5. The method of claim 1 further comprises initializing value of the current distribution parameter when anomaly detection was performed unless the anomaly detection generated a result indicating statistical uncertainty as to the existence or not of an anomaly.

6. The method of claim 1 further comprises accumulating, by the anomaly detector, a preceding set of measurement values for the performance metric, where the preceding set of measurement values were acquired during execution of transactions in the preceding period of time;

calculating, by the anomaly detector, the baseline distribution parameter from the preceding set of measurement values; and storing, by the anomaly detector, the baseline distribution parameter in a repository.

7. The method of claim 1 wherein the baseline distribution parameter and the current distribution parameter are selected from the group comprising mean, median, standard deviation, and quantile.

8. The method of claim 1 wherein capturing a plurality of measurement values for a performance metric further comprises instrumenting bytecode for the monitored application with the sensor.

9. The method of claim 1 wherein capturing a plurality of measurement values for a performance metric further comprises identifying elements in a document object model that contains request directives and instruments an identified element with the sensor, where the monitored application is further defined as a web browser instrumented with a browser agent and the browser agent instruments the identified element with the sensor.

10. The method of claim 9 wherein the request directive is defined as content update request directive or content load request directive.

11. The method of claim 9 wherein the request directive is defined as resource request directive.

12. The method of claim 1 wherein calculating a current distribution parameter further comprises calculating a quantile for the plurality of measurement values using an estimation method that examines each measurement value in the plurality of measurement values only once.

13. The method of claim 12 wherein the estimation method is further defined as a $p^2$ algorithm.

14. The method of claim 1 further comprises
calculating, by the anomaly detector, a second current distribution parameter from the plurality of measurement values, where the second current distribution parameter differs from the current distribution parameter and is indicative of statistical distribution of the plurality of measurement values for the performance metric during the present period of time;
retrieving, by the anomaly detector, a second baseline distribution parameter for the performance metric, where the second baseline distribution parameter is of same type as the second current distribution parameter and is indicative of statistical distribution of measurement value for the performance metric during the preceding period of time; and
detecting, by the anomaly detector, another type of anomaly in the performance metric by comparing the second current distribution parameter to the second baseline distribution parameter.

15. The method of claim 1 wherein the current distribution parameter has a value that changes in response to an anomaly that affects a majority of the measurement values for the performance metric.

16. The method of claim 15 wherein the current distribution parameter is defined as a 0.5 quantile.

17. The method of claim 1 wherein the current distribution parameter has a value that changes in response to an anomaly that causes outliers of the performance metric.

18. The method of claim 17 wherein the current distribution parameter is defined as a 0.9 quantile.

19. The method of claim 1 further comprises
receiving, by a measure extractor, a plurality of transaction events resulting from transactions executed in the distributed computing environment, where the transaction event include a measurement value for at least one performance metric;
grouping, by the measure extractor, transaction events in the plurality of transaction events into a group of transaction events, where the transaction events in the group of transaction event are from transaction that perform similar tasks; and
extracting, by the measure extractor, measurement values for the performance metric from the transaction events in the group of transaction events to form the group of measurement values, where the measure extractor is executed by a processor of a computing device.

20. The method of claim 19 further comprises grouping transaction events in the group of transaction events using data extracted from a request that initiated the transaction associated with the transaction events.

21. The method of claim 20 wherein grouping transaction events further comprises extracting a uniform resource locator from the request, parsing the uniform resource locator to determine an identifier for a server to which the request was sent and a path identifying an addressed resource on the server, and grouping transaction events using the identifier for the server to which the request was sent and the path identifying an addressed resource on the server.

22. A computer-implemented method for detecting anomalies in a performance metric associated with monitored transactions of a distributed computing environment, comprising:
receiving, by a transaction monitor, a plurality of transaction events resulting from transactions executed in the distributed computing environment, where the transaction events include a measurement value for at least one performance metric and the measurement value was acquired during execution of transactions in a present period of time;
grouping, by the transaction monitor, transaction events in the plurality of transaction events into a group of transaction events, where the transaction events in the group of transaction event are from transaction that perform similar tasks; and
extracting, by the transaction monitor, measurement values for a given performance metric from the transaction events in the group of transaction events to form the group of measurement values
calculating, by the transaction monitor, a current distribution parameter from the measurement values in the group of measurement values, where the current distribution parameter is indicative of statistical distribution of the measurement values for the given performance metric during the present period of time;
retrieving, by the transaction monitor, a baseline distribution parameter for the performance metric, where the baseline distribution parameter is indicative of statistical distribution of measurement value for the performance metric during a preceding period of time, where the preceding period of time precedes the present period of time; and
detecting, by the transaction monitor, a change in shape of statistical distribution of the performance metric by comparing the current distribution parameter to the baseline distribution parameter,
determining whether quantity of the measurement values in the group of measurement values exceeds a significance threshold; and
detecting an anomaly in the performance metric based on the detected change in shape of the statistical distribution only when the quantity of measurement values exceeds the significance threshold, where the transaction monitor is executed by a processor of a computing device.

23. An anomaly detection system that monitors transaction in a distributed computing environment, comprising:
a sensor instrumented in a monitored application residing on a host computer and executed by a processor of the host computer, the sensor generates one or more transaction events and sends the transaction events across a network to a monitoring computer;
a transaction classifier residing on the monitoring computer, the transaction classifier is configured to receive a plurality of transaction events resulting from transactions executed in the distributed computing environment and, in response to receiving the plurality of transaction events, group a portion of the plurality of transaction events into a group of transaction events, where the transaction events in the group of transaction event are from transactions that perform similar tasks;
a measure extractor residing on the monitoring computer, the measure extractor is configured to receive the group of transaction events and extract measurement values for a given performance metric from the transaction events in the group of transaction events to form a group of measurement values, where a transaction event includes a measurement value for the given performance metric and the measurement value was acquired during execution of a transaction in a present period of time; and
an anomaly detector residing on the monitoring computer and configured to receive the group of measurement values and determine whether quantity of the measurement values in the group of measurement values exceeds a significance threshold, the anomaly detector calculates a current distribution parameter from the group of measurement values and detects a change in shape of statistical distribution of the group of measurement values by comparing the current distribution parameter to a baseline distribution parameter and detects an anomaly in the performance metric based on the detected change in shape of the statistical distribution only when the quantity of measurement values exceeds the significance threshold, where the current distribution parameter is indicative of statistical distribution of the measurement values for the given performance metric during the present period of time and the baseline distribution parameter is indicative of statistical distribution of measurement values for the given performance metric during a preceding period of time, where the preceding period of time precedes the present period of time and the transaction classifier, the measure extractor and the anomaly detector are executed by a processor of the monitoring computer.

24. The system of claim 23 wherein the anomaly detector, in response to detecting a change in shape of the statistical distribution in the given performance metric, generates an alert.

25. The system of claim 23 wherein the anomaly detector identifies an anomaly in the given performance metric when the current distribution parameter falls outside a tolerance of the baseline distribution parameter.

26. The system of claim 23 wherein the anomaly detector initializes value of the current distribution parameter when anomaly detection was performed unless the anomaly detection generated a result indicating statistical uncertainty as to the existence or not of an anomaly.

27. The system of claim 23 wherein the anomaly detector accumulates a preceding set of measurement values for the given performance metric, calculates the baseline distribution parameter from the preceding set of measurement values, and stores the baseline distribution parameter in a repository, where the preceding set of measurement values were acquired during execution of transactions in the preceding period of time.

28. The system of claim 23 wherein the anomaly detector calculates the current distribution parameter by calculating a quantile for the group of measurement values using an estimation method that examines each measurement value in the group of measurement values only once.

29. The system of claim 28 where the estimation method is further defined as a $p^2$ algorithm.

30. The system of claim 23 wherein the sensor is instrumented in bytecode of the monitored application.

31. The system of claim 23 where the monitored application is further defined as a web browser instrumented with a browser agent such that the browser agent identifies elements in a document object model that contain a resource load directive and instruments an identified element with the sensor.

32. A computer-implemented method for detecting anomalies in a performance metric associated with monitored transactions of a distributed computing environment, comprising:
capturing, by a sensor instrumented in a monitored application, a plurality of measurement values for a performance metric, where the performance metric is for a transaction executed in part by the monitored application, and the sensor and the monitored application reside on and are executed by a processor of a host computer;
calculating, by the anomaly detector, a current distribution parameter from the plurality of measurement values, where the current distribution parameter is a quantile for the plurality of measurement values for the performance metric during the present period of time;
retrieving, by the anomaly detector, a baseline distribution parameter for the performance metric, where the baseline distribution parameter is a quantile for the performance metric during a preceding period of time, where the preceding period of time precedes the present period of time; and
detecting, by the anomaly detector, a change in shape of the statistical distribution of the plurality of measurement values for the performance metric during the present period of time by comparing the current distribution parameter to the baseline distribution parameter, where the anomaly detector is executed by a processor of a monitoring computer residing across a network from the host computer.

* * * * *